US011506900B2

(12) United States Patent
Roessel et al.

(10) Patent No.: US 11,506,900 B2
(45) Date of Patent: Nov. 22, 2022

(54) THIN, MULTI-FOCAL PLANE, AUGMENTED REALITY EYEWEAR

(71) Applicant: Intel Corporation, Santa Clara, CA (US)

(72) Inventors: Sabine Roessel, Munich (DE); Ronald Azuma, San Jose, CA (US); Mario Palumbo, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 24 days.

(21) Appl. No.: 17/178,931

(22) Filed: Feb. 18, 2021

(65) Prior Publication Data

US 2021/0173219 A1     Jun. 10, 2021

Related U.S. Application Data

(63) Continuation of application No. 16/370,670, filed on Mar. 29, 2019, now Pat. No. 10,928,639.

(51) Int. Cl.
  *G02B 27/01*  (2006.01)
  *G02B 27/09*  (2006.01)
  *F21V 8/00*  (2006.01)

(52) U.S. Cl.
  CPC ........ *G02B 27/0172* (2013.01); *G02B 6/0076* (2013.01); *G02B 27/0955* (2013.01); *G02B 2027/0112* (2013.01); *G02B 2027/0178* (2013.01); *G02B 2027/0185* (2013.01)

(58) Field of Classification Search
  None
  See application file for complete search history.

(56) References Cited

U.S. PATENT DOCUMENTS

| 10,928,639 B2 * | 2/2021 | Roessel ............. G02B 27/0955 |
| 2018/0356639 A1 | 12/2018 | Schaefer et al. |
| 2019/0243123 A1 * | 8/2019 | Bohn .................... G02B 6/122 |

(Continued)

OTHER PUBLICATIONS

United States Patent and Trademark Office, "Non Final Office Action," issued in connection with U.S. Appl. No. 16/370,670, dated Apr. 9, 2020, 13 pages.

(Continued)

*Primary Examiner* — Michael Stahl
(74) *Attorney, Agent, or Firm* — Hanley, Flight & Zimmerman, LLC

(57) ABSTRACT

Thin, multi-focal plane, augmented reality eyewear are disclosed. An example lens structure includes a two-layer waveguide including a first waveguide and a second waveguide. The two-layer waveguide produces a virtual object based on light from an image source. The two-layer waveguide causes the virtual object to appear at a first virtual object focal plane. The first waveguide propagates more of the light in a first wavelength range than in a second wavelength range. The second waveguide propagates more of the light in the second wavelength range than in the first wavelength range. The first wavelength range is associated with longer wavelengths than the second wavelength range. The lens structure further includes an optical lens to cause the virtual object to appear at a second virtual object focal plane associated with a shorter apparent distance from a user than the first virtual object focal plane.

29 Claims, 9 Drawing Sheets

(56) References Cited

U.S. PATENT DOCUMENTS

2019/0278086 A1  9/2019  Ofir
2019/0377122 A1  12/2019  Danziger

OTHER PUBLICATIONS

United States Patent and Trademark Office, "Notice of Allowance and Fee(s) Due," issued in connection with U.S. Appl. No. 16/370,670, dated Oct. 9, 2020 5 pages.

* cited by examiner

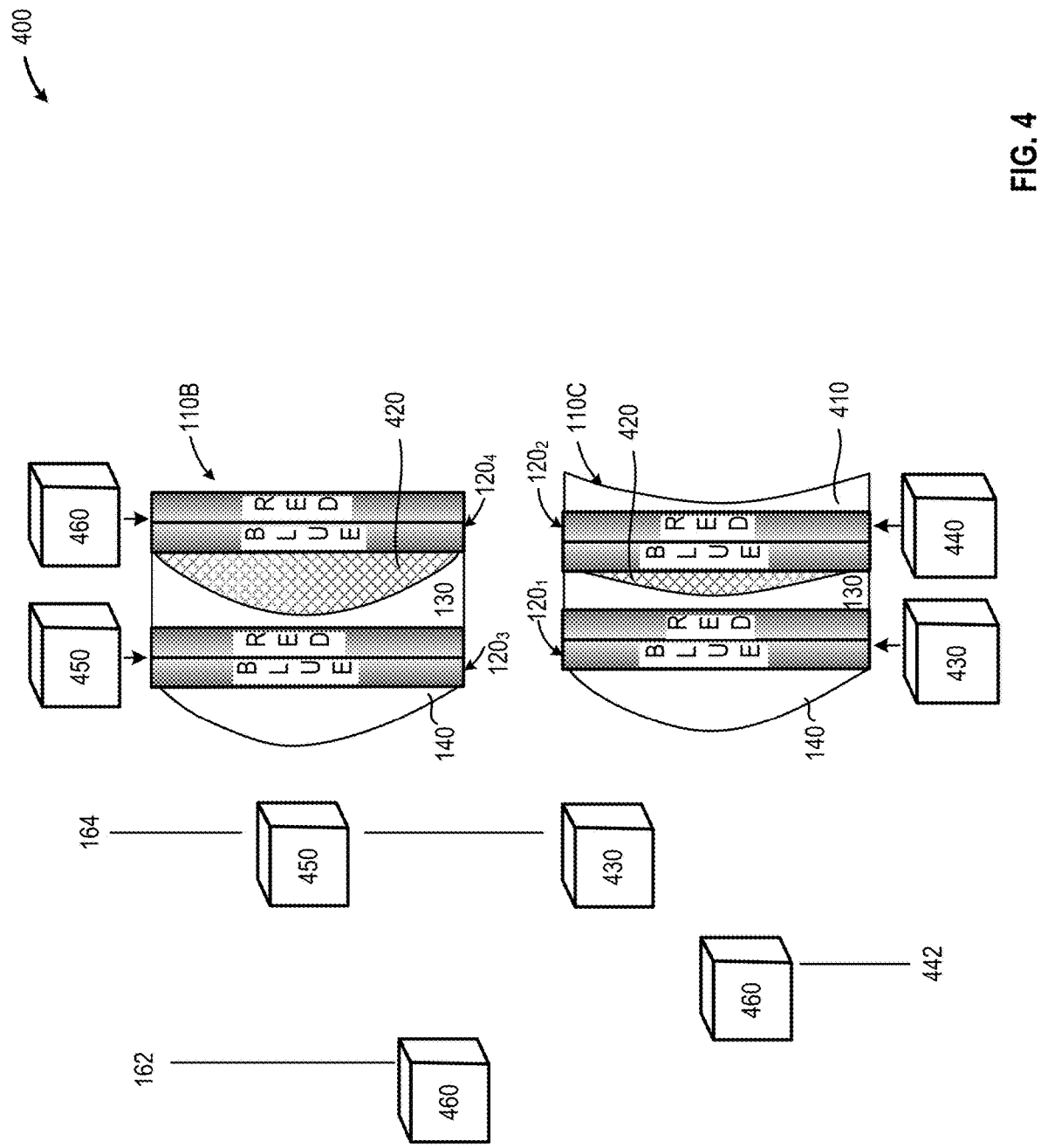

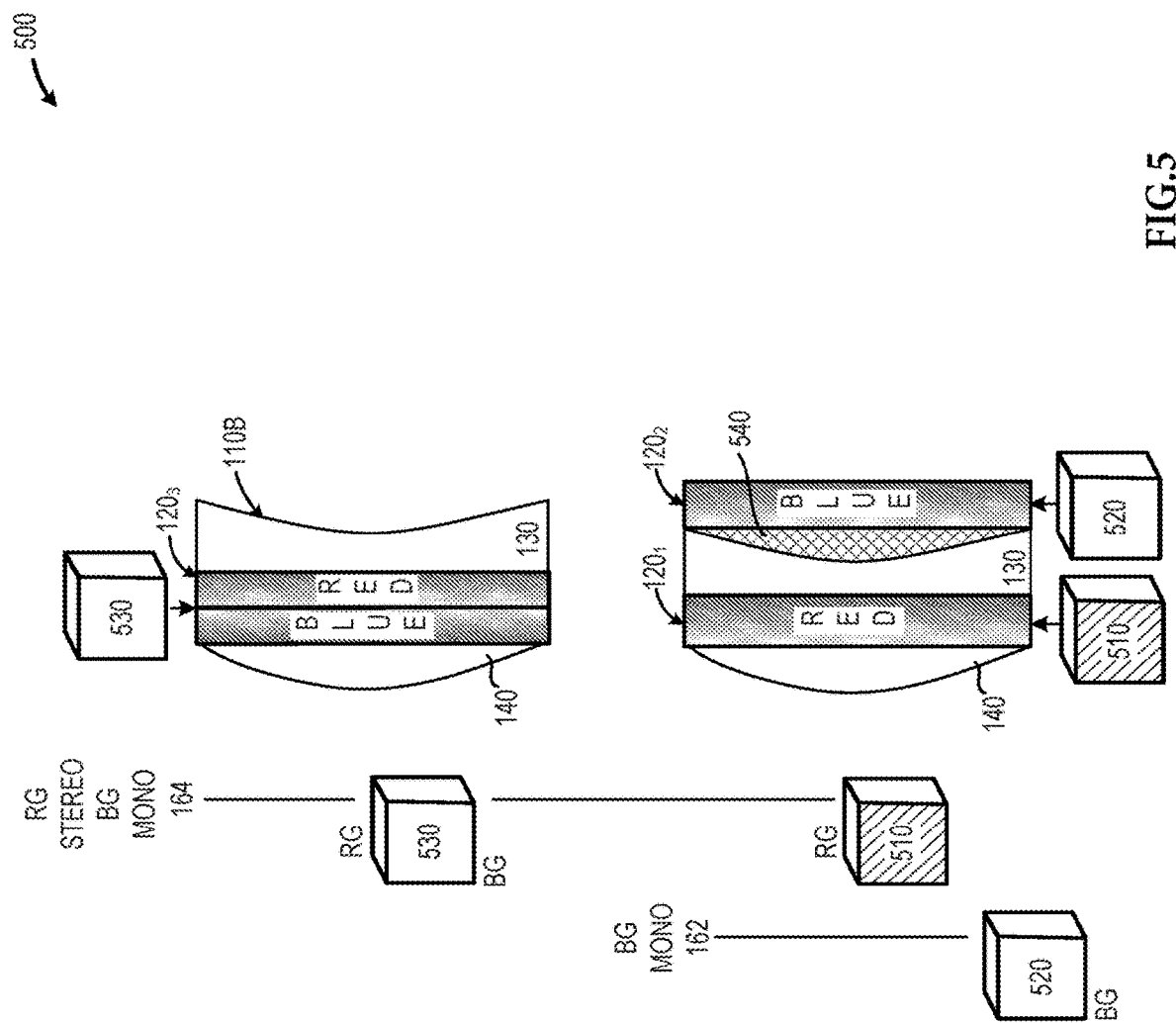

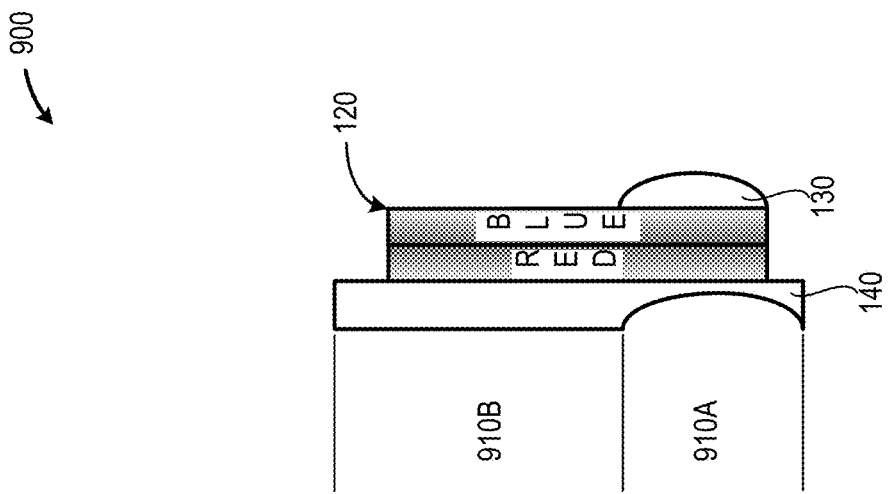
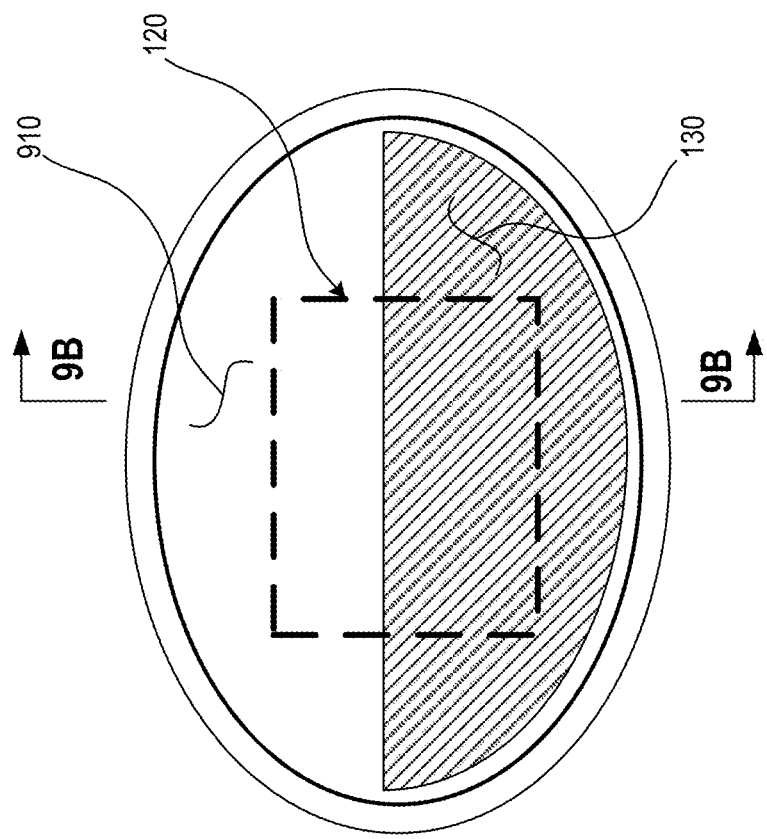

THIN, MULTI-FOCAL PLANE, AUGMENTED REALITY EYEWEAR

RELATED APPLICATION(S)

The patent arises from a continuation of U.S. patent application Ser. No. 16/370,670 (now U.S. Pat. No. 10,928, 639) filed on Mar. 29, 2019, and which is incorporated herein by reference in its entirety. Priority to U.S. patent application Ser. No. 16/370,670 is claimed.

TECHNICAL FIELD

The present disclosure relates to augmented reality eyewear, and more specifically to augmented reality eyewear implemented using waveguide technology.

BACKGROUND

Augmented reality eyewear displays virtual objects within a real-world field-of-view containing physical objects. Augmented reality technology is applicable in many instances and for many applications, such as game-playing, overlaying information about real-world objects within the eyewear user's field-of-view. Typically, the augmented reality eyewear receives an optical signal and displays the virtual object at a defined location within the field-of-view of the eyewear user. Several challenges exist, however, with the design of such eyewear and with the display of the virtual objects, particularly with respect to real-world physical objects that appear within the field-of-view of the eyewear user. First, real-world, physical, objects may be positioned at virtually any distance from the eyewear user, coordinating the focal plane of the displayed virtual object with the focal plane of a physical object such that the eyewear user is able to focus on both objects presents the first challenge. Second, augmented reality eyewear relies upon an optical system that includes lenses and display technology such as waveguide layers that, packaging the lenses and display technology to maintain an acceptable level of optical transmittivity presents the second challenge. Third, the combination of lenses and display technology increases the weight of the augmented reality eyewear, maintaining the weight and balance of the eyewear to assure a comfortable user experience presents the third challenge.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

FIG. 4 is a schematic diagram of an illustrative triple focal plane augmented reality eyewear system that includes a first lens structure having: a first waveguide, a second waveguide, a first optical element, a second optical element, and a third optical element, and a second lens structure having: a third waveguide, a fourth waveguide, a first optical element, and a second optical element, in accordance with at least one embodiment described herein;

FIG. 5 is a schematic diagram of an illustrative triple focal plane augmented reality eyewear system that includes a first lens structure having: a first, single-layer, RG waveguide, a second, single-layer, BG waveguide, a first optical element, a second optical element; and, a second lens structure having: a third, multi-layer, waveguide, a first optical element, and a second optical element, in accordance with at least one embodiment described herein;

FIG. 9A is an elevation of an illustrative bifocal augmented reality eyewear system that includes an upper portion capable of displaying virtual objects at the first, relatively distant, virtual object focal plane and a lower portion capable of displaying virtual objects at the second, relatively close, virtual object focal plane, in accordance with at least one embodiment described herein; and FIG. 9B is a cross-sectional elevation of the bifocal lens depicted in FIG. 9A that more clearly depicts the two-layer waveguide disposed between the first optical element and the second optical element, in accordance with at least one embodiment described herein.

Figure 1:
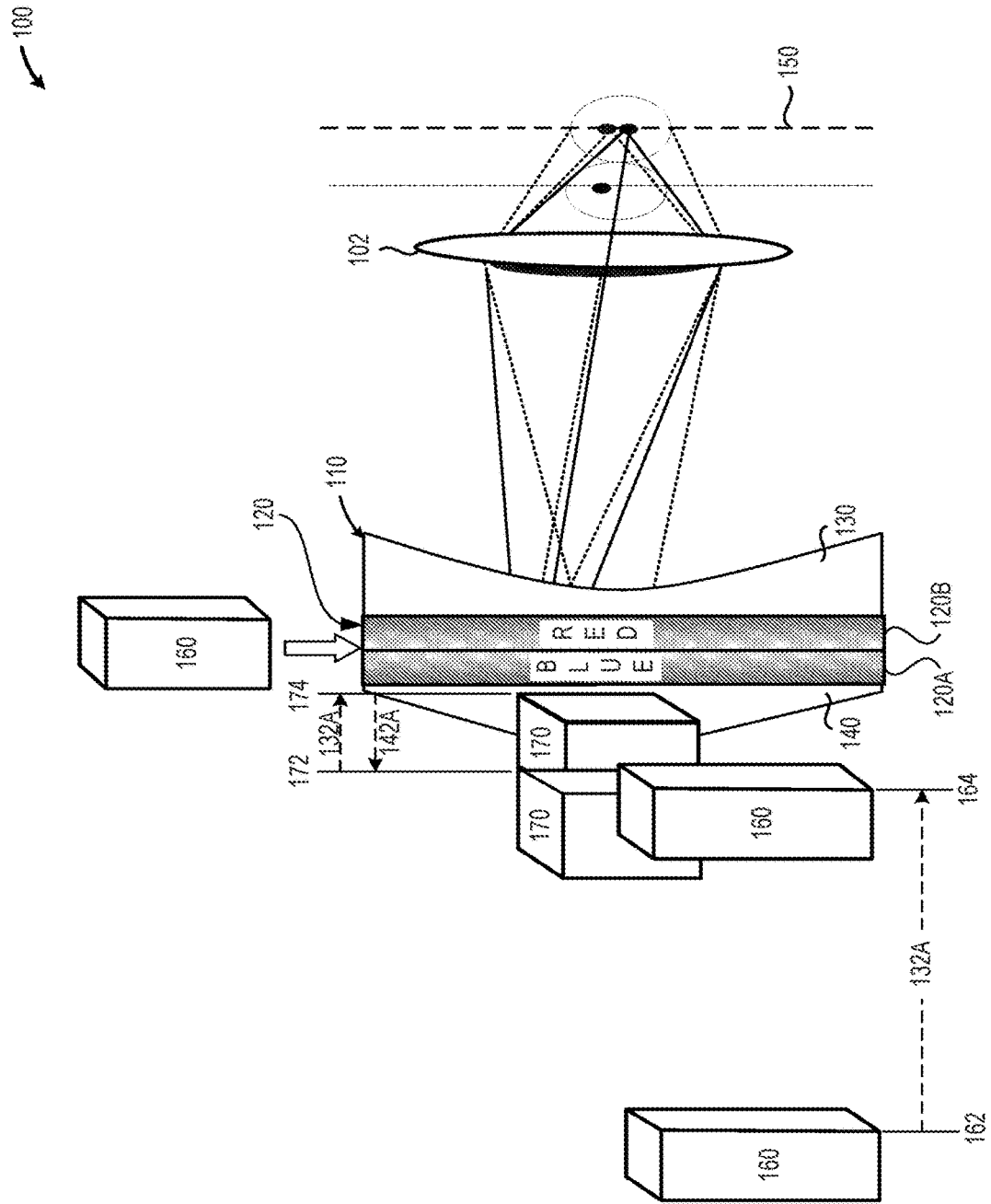
FIG. 1 is a schematic diagram of an illustrative augmented reality system in which a lens structure includes a waveguide, a first optical element, and a second optical element, in accordance with at least one embodiment described herein.

Although the following Detailed Description will proceed with reference being made to illustrative embodiments, many alternatives, modifications and variations thereof will be apparent to those skilled in the art.

DETAILED DESCRIPTION

The systems and methods disclosed herein beneficially aggregate lens layers, such as polycarbonate lenses used for correction of myopia and/or presbyopia, with up to three waveguide layers resulting in a multi-focal plane display that may be fabricated or manufactured to provide prescription lens behaviors. The systems and method disclosed herein beneficially provide lens structures suitable for use in augmented reality applications that have a transmittance of greater than 70%. The systems and methods disclosed herein beneficially provide a lightweight, form-fitting, eyewear that does not obstruct the eyewear user's field-of-view.

The systems and methods disclosed herein make use of two-dimensional (2D) waveguides. In particular, the systems and methods disclosed herein make use of a first waveguide layer that preferentially emits electromagnetic energy in the blue to green portion of the visible electromagnetic spectrum and second waveguide layer that preferentially emits electromagnetic energy in the red to green portions of the visible electromagnetic spectrum. These waveguide layers may be combined to provide a waveguide that covers substantially all of the visible electromagnetic spectrum while maintaining a transmittance through the waveguide in excess of 80% and a waveguide thickness of less than 3.5 millimeters.

As used herein, the term "virtual object focal plane" refers to an apparent distance that a virtual object appears measured with respect to a waveguide producing the human-visible image of the virtual object.

As used herein, the terms "blue-green waveguide: and "BG waveguide" refer to a waveguide structure capable of propagating and emitting electromagnetic energy primarily in the blue to green visible electromagnetic spectrum, having wavelengths from about 380 nanometers to about 600 nanometers. Such BG waveguides may also propagate and emit electromagnetic energy in the green to red visible electromagnetic spectrum, although at lower levels relative to the propagation and emission of electromagnetic energy in the blue to green visible electromagnetic spectrum.

As used herein, the terms "red-green waveguide: and "RG waveguide" refer to a waveguide structure capable of propagating and emitting electromagnetic energy primarily in the red to green visible electromagnetic spectrum, having wavelengths from about 500 nanometers to about 790 nanometers. Such RG waveguides may also propagate and emit electromagnetic energy in the blue to green visible electromagnetic spectrum, although at lower levels relative to the propagation and emission of electromagnetic energy in the red to green visible electromagnetic spectrum.

As used herein, the term "light" refers to electromagnetic waves and/or electromagnetic energy occurring within all or a portion of the human-visible electromagnetic spectrum extending from wavelengths of from about 380 nanometers to about 790 nanometers.

Typically, an embedded virtual object is displayed at a fixed focal plane of about 3.5 to 5 meters in front of the lens structure while the plane of physical objects appearing in the field-of-view of the augmented reality eyewear user may be closer, for example at arm's length or about 1 meter. On the other hand, physical objects may appear at a variety of distances, some of which are vastly different than the 3.5 to 5 meter distance to the embedded virtual object. The difference in the apparent distance to embedded virtual objects and one or more physical objects causes eyestrain due to the accommodation-convergence conflict. That is, the viewer's eyes converge (rotate) upon a particular object that is at some distance. But to see that virtual object in focus, the user's eyes must also focus, or accommodate, to the accommodation distance. The need to refocus an augmented reality system user's eyes to accommodate the difference in the focal plane of the virtual object and the real-world position of the physical object creates stress on the user and may cause discomfort to the eyes of the augmented reality system user. The difference between the convergence distance and the accommodation distance causes eyestrain. Since the displays described here can render virtual objects at more than one accommodation distance, they can significantly reduce eyestrain. While one could use a plano-concave lens positioned between the waveguide providing the image of the virtual object and the augmented reality system user's eyes to "pull in" the focal plane of the virtual object to about 1 meter, such a lens would also tend to "pull in" the real-world, physical, object as well. Thus, a simple plano-concave lens may reduce, but does not eliminate the eye stress caused by the difference in the focal plane of the virtual object and the apparent physical location of the real-world object.

The systems and methods described herein provide lens structures in which optical lenses (e.g., plano-convex and plano-concave lenses) are combined with blue-green waveguide (hereinafter "BG waveguide") and red-green waveguide (hereinafter, "RG-waveguide" layers to provide an augmented reality having a multiple focal planes for virtual objects displayed by the waveguide layers. In embodiments, one, two, three, or four (or more) virtual object focal planes may be similarly accommodated using a lens structure containing a number of lenses, BG waveguides, and RG waveguides.

An augmented reality vision system is provided. The augmented reality vision system may include: a lens structure including: a waveguide coupleable to an image source, the waveguide having a first surface and a transversely opposed second surface, the waveguide to: output a human-visible image of a virtual object using at least a portion of the visible electromagnetic spectrum; and pass at least a portion of electromagnetic energy reflected by a physical object appearing within a field-of-view of the lens structure; a first optical element disposed proximate the second surface of the waveguide, the first optical element positioned between the waveguide and an augmented reality system user, the first optical element to: pass the human-visible image of the virtual object and at least a portion of the electromagnetic energy reflected by the physical object appearing within the field-of-view of the lens structure; and draw the human-visible virtual object from a first, relatively distant, virtual object focal plane to a second, relatively close, virtual object focal plane; a second optical element disposed proximate the first surface of the waveguide, the first convex optical element to: pass only the electromagnetic energy reflected by the physical object appearing within the field-of-view of the lens structure; and cause the physical object to appear to the augmented reality system user at a distance about equal to the second, relatively close, virtual object focal plane.

An augmented reality eyewear apparatus is provided. The augmented reality eyewear apparatus may include: a first lens structure having a first optical axis and a minimum transmissivity of at least 70%, the first lens structure including: a first waveguide disposed transverse to the first optical axis and positioned at least partially between a plano-concave optical element and an augmented reality eyewear user and a plano-convex optical element positioned on a side of the first waveguide opposite the first optical element, the first waveguide to output a human-visible image of a virtual object using at least a portion of the visible electromagnetic spectrum; the plano-concave optical element to pass the human-visible image of the virtual object and at least a portion of the electromagnetic energy reflected by the physical object appearing within the field-of-view of the first lens structure; and the plano-convex optical element to pass only the electromagnetic energy reflected by the physical object appearing within the field-of-view of the first lens structure; a second lens structure having a second optical axis and a minimum transmissivity of at least 70%, the second lens structure including: a second waveguide disposed transverse to the second optical axis and positioned at least partially between a plano-concave optical element and the augmented reality eyewear user and a plano-convex optical element positioned on a side of the second waveguide opposite the first optical element, the second waveguide to output a human-visible image of a virtual object using at least a portion of the visible electromagnetic spectrum; the plano-concave optical element to pass at least a portion of the human-visible image of a virtual object and at least a portion of the electromagnetic energy reflected by the physical object appearing within the field-of-view of the second lens structure; and the plano-convex optical element to pass only the electromagnetic energy reflected by the physical object appearing within the field-of-view of the second lens structure; and a frame physically coupling the first lens structure to the second lens structure.

FIG. 1 is a schematic diagram of an illustrative augmented reality system 100 in which a lens structure 110 includes a waveguide 120, a first optical element 130, and a second optical element 140, in accordance with at least one embodiment described herein. In embodiments, the waveguide 120 may include a first, single-layer, BG waveguide 120A disposed proximate a second, single-layer, RG waveguide 120B. A virtual object 160 may be provided to the waveguide 120 for display to the augmented reality system user 102. In the embodiment depicted in FIG. 1, the waveguide 120 may display the virtual object 160 at a first virtual object focal plane 162 relatively distant from the lens structure 110 and a physical object 170 in the field-of-view of the lens structure 110 may be positioned a first distance 172 that is relatively closer to the lens structure 110.

The first optical element 130 may be positioned or otherwise disposed proximate the waveguide 120, between a surface of the waveguide 120 and the augmented reality system user 102. By positioning the first optical element 130 between the waveguide 120 and the augmented reality system user 102, the image of the virtual object 160 passes through the first optical element 130. The first optical element draws the virtual object 160 from the first virtual object focal plane 162 to a second virtual object focal plane 164 relatively closer to the lens structure 110. Additionally, since the ambient light reflected from the physical object 170 also passes through the first optical element 130, the apparent distance between the lens structure 110 and the physical object 170 is reduced from the first distance 172 to a second distance 174 closer to the lens structure 110.

To correct the apparent distance between the physical object 170 and the lens structure 110, a second optical element 140 may be disposed proximate the waveguide 120 in transverse opposition to the first optical element 130. The second optical element 140 corrects the apparent distance between the lens structure 110 and the physical object 170 such that the apparent distance between the lens structure 110 and the physical object 170 is approximately equal to the second virtual object focal plane 164. Since the image of the virtual object 160 does not pass through the second optical element 140, the position of the virtual object 160 remains at the first virtual object focal plane 162. Thus, both the virtual object 160 and the physical object 170 appear in focus to the augmented reality system user 102, with both objects focused on a single plane 150.

The waveguide 120 may include one or more full-spectrum, single-layer waveguides capable of passing all or a portion of the human-visible electromagnetic spectrum. The waveguide 120 may include one or more single-layer BG waveguides 120A, one or more single-layer RG waveguides 120B, or any combination thereof. The waveguide 20 may include any number and/or combination of currently available and/or future developed waveguide structures, including but not limited to: one or more diffractive waveguides, one or more reflective waveguides, one or more polarization-based waveguides, one or more holographic waveguides, and similar. In embodiments, the waveguide 120 may include a single-layer BG waveguide 120A disposed proximate a single-layer RG waveguide 120B, such as depicted in the example embodiment in FIG. 1. The waveguide 120 provides the image of the virtual object 160 to the augmented reality system user 102. The waveguide 120 may be communicatively coupled to an image source. Example processor-based devices include but are not limited to: portable computers, wearable computers, smartphones, laptop computers, cloud based file servers, and similar. In embodiments, the waveguide 120 may have a transmittivity of: greater than about 70%; greater than about 80%; greater than about 85%; or greater than about 90%. In embodiments, the waveguide 120 may include a generally planar structure having a first surface disposed near the augmented reality system user 102 and a transversely opposed second surface. In embodiments, the waveguide 120 is aligned with the optical axis of the lens structure.

The first optical element 130 may include a simple lens or a compound lens system. In embodiments, the first optical element 130 includes a plano-concave lens disposed proximate the first surface of the waveguide 120. The first optical element 130 may include one or more lenses fabricated using one or more materials such as glass, polycarbonate, plastic, high-index plastic, and similar. The first optical element 130 draws 132A the virtual object 160 from the relatively distant first virtual object focal plane 162 to the relatively closer second virtual object focal plane 164. The first optical element 130 also draws 132A the apparent distance between the lens structure 110 and the physical object 170 from a relatively distant first distance 172 to a relatively closer second distance 174.

The second optical element 140 may include a simple lens or a compound lens system. In embodiments, the second optical element 140 includes a plano-convex lens disposed proximate the second surface of the waveguide 120, transversely opposite the first optical element 130. The second optical element 140 may include one or more lenses fabricated using one or more materials such as glass, polycarbonate, plastic, high-index plastic, and similar. The second optical element 140 pushes 142A the apparent distance between the lens structure 110 and the physical object 170 from the relatively close second distance 174 to the relatively distant first distance 172. In embodiments, the first distance 174 may be equal to or approximately equal to the second virtual object focal plane 164 such that the virtual object 160 and the physical object 170 appear on the same focal plane 150 to the augmented reality system user 102. In embodiments, the first lens structure 110 may have a transmittivity of: greater than about 60%; greater than about 70%; greater than about 75%; greater than about 80%; or greater than about 85%.

Figure 2:
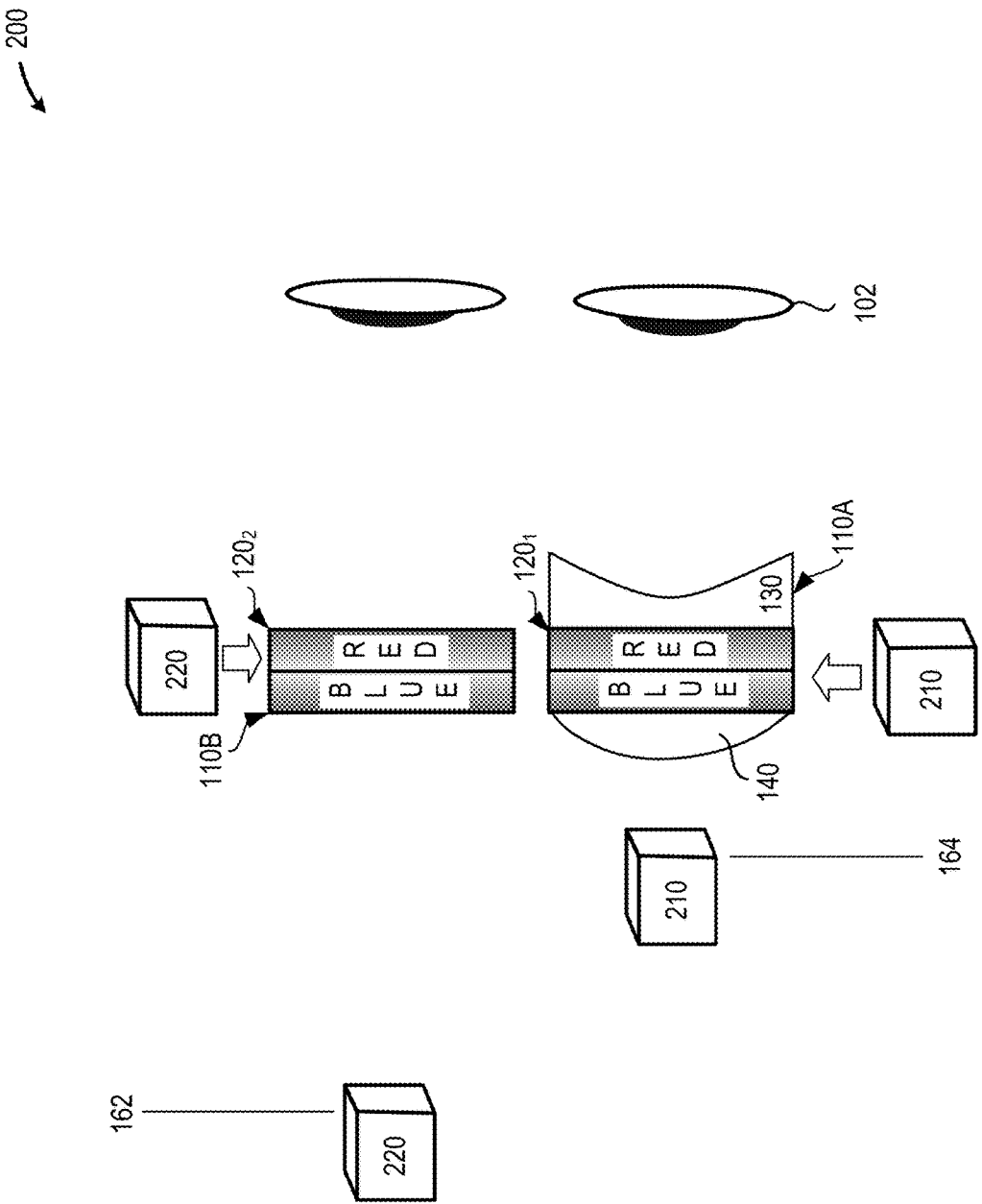
FIG. 2 is a schematic diagram of an illustrative augmented reality eyewear system that includes a first lens structure that includes a first waveguide, a first optical element, and a second optical element and a second lens structure that includes a second waveguide, in accordance with at least one embodiment described herein.

FIG. 2 is a schematic diagram of an illustrative augmented reality eyewear system 200 that includes a first lens structure 110A that includes a first waveguide $120_1$, a first optical element 130, and a second optical element 140 and a second lens structure 110B that includes a second waveguide $120_2$, in accordance with at least one embodiment described herein. As depicted in FIG. 2, the augmented reality eyewear system 200 permits the augmented reality system user 102 to use the first lens structure 110A to focus on a first virtual object 210 that appears at the relatively close second virtual object focal plane 164. In addition, as described above with regard to FIG. 1, the first lens structure 110A includes the first optical element 130 and the second optical element 140 such that apparent distance to a physical object positioned in the field-of-view of the augmented reality eyewear system 200 appears at a distance that is approximately equal to the second virtual object focal plane 164. Since the second lens structure 110B includes only the waveguide 120, the image of a second virtual object 220 appears at the relatively distant first virtual object focal plane 162.

In embodiments, the first waveguide $120_1$ may include a single layer waveguide or two layer waveguide. The first waveguide $120_1$ may include a two layer waveguide that includes one or more BG waveguides 120A and one or more RB waveguides 120B. The first lens system 110A may have a transmittivity of: greater than about 60%; greater than about 70%; greater than about 75%; greater than about 80%; or greater than about 85%. In embodiments, the first lens system 110A may have a thickness of about: 10 millimeters (mm) or less; 9 mm or less; 8 mm or less; or 7 mm or less measured along the optical axis of the first lens system 110A.

In embodiments, the second waveguide $120_2$ may include a single layer waveguide or two-layer waveguide. The second waveguide $120_2$ may include a two-layer waveguide that includes one or more BG waveguides 120A and one or more RB waveguides 120B. Although not depicted in FIG. 2, the second waveguide $120_2$ may be disposed proximate one or more non-corrective lenses that provide a substrate and/or cover for the second waveguide $120_2$. The second lens system 110B may have a transmittivity of: greater than about 60%; greater than about 70%; greater than about 75%; greater than about 80%; or greater than about 85%. In embodiments, the second lens system 110B may have a thickness of about: 10 millimeters (mm) or less; 9 mm or less; 8 mm or less; or 7 mm or less measured along the optical axis of the second lens system 110B.

In the embodiment depicted in FIG. 2, the augmented reality system user 102 will use the first lens structure 110A to view one or more physical objects and one or more first virtual objects 210 at a relatively close apparent distance/relatively close second virtual object focal plane 164. In embodiments the relatively close second virtual object focal plane 164 may include a focal plane that provides an apparent distance between the first lens structure 110A and the second virtual object focal plane 164 of about: 2 meters (m) or less; 1.5 m or less; or 1 m or less. The augmented reality system user 102 will use the second lens structure 110B to view one or more second virtual objects 220 at a relatively distant first virtual object focal plane 162. Thus, in the system depicted in FIG. 2 the augmented reality system user 102 will use a first eye to view one or more physical objects and the one or more first virtual objects 210 at the relatively close second virtual object focal plane 164 and a second eye to view the one or more second virtual objects 220 at the relatively distant first virtual object focal plane 162.

Figure 3B:
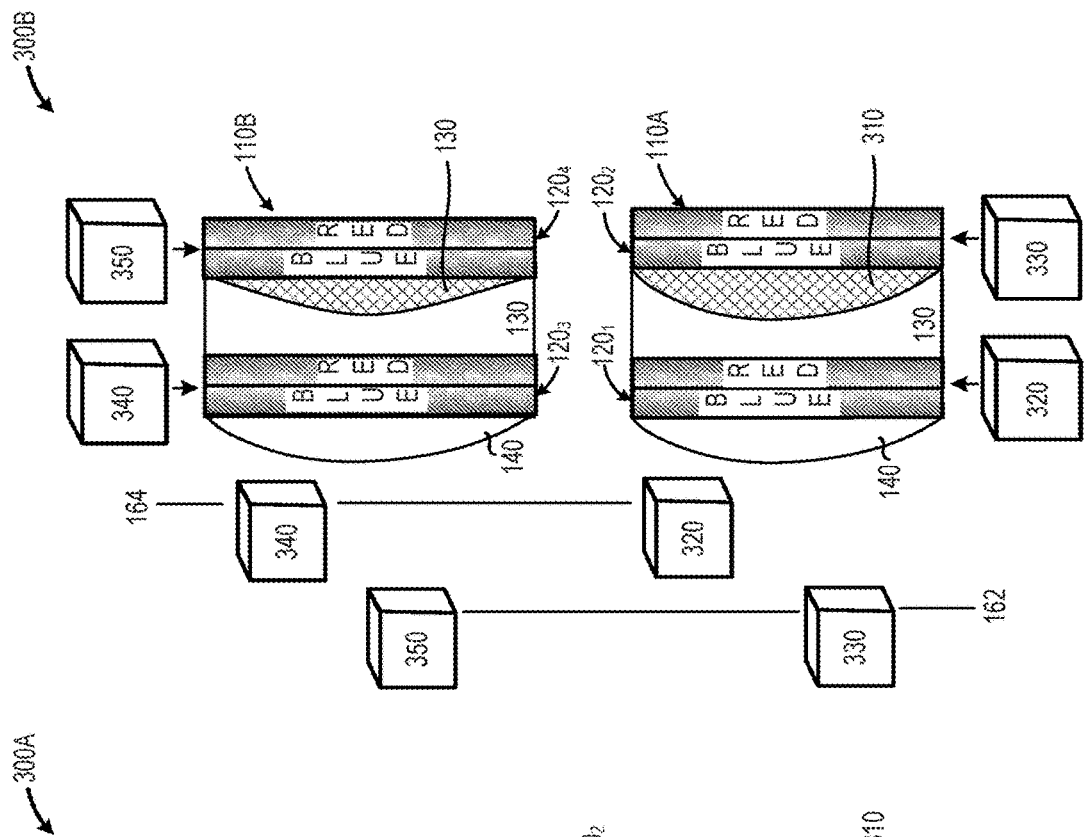
FIG. 3B is a schematic diagram of an illustrative augmented reality eyewear system that includes a first lens structure having: a first waveguide, a second waveguide, a first optical element, and a second optical element and a second lens structure having: a first waveguide, a second waveguide, a first optical element, and a second optical element, in accordance with at least one embodiment described herein.
Figure 3A:
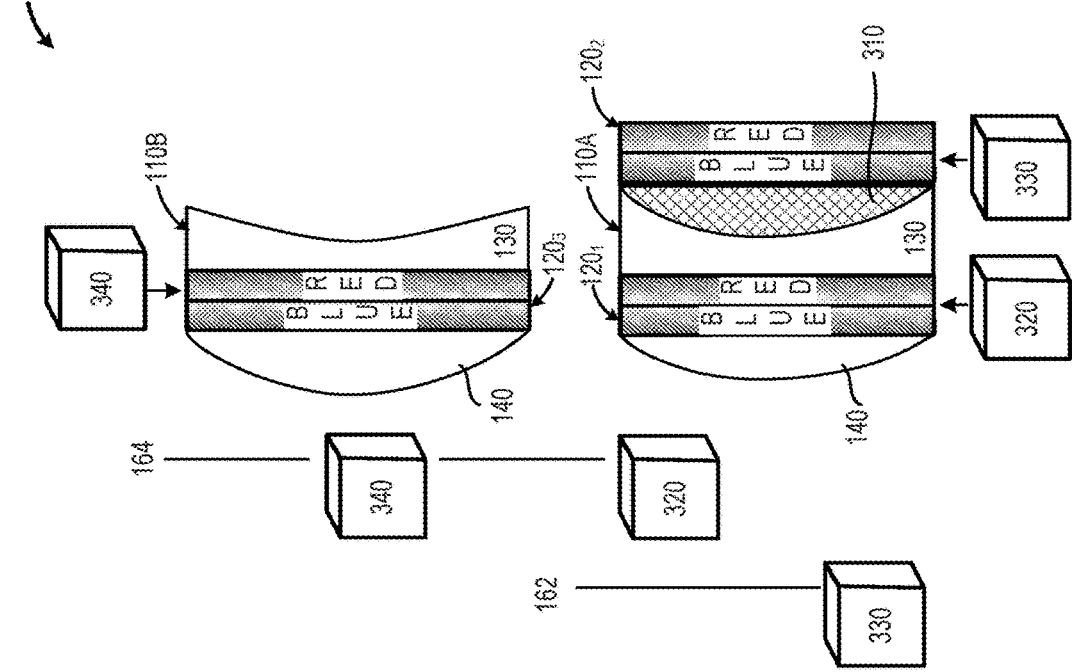
FIG. 3A is a schematic diagram of an illustrative augmented reality eyewear system that includes a first lens structure that includes: a first waveguide, a second waveguide, a first optical element, and a second optical element and a second lens structure that includes a first waveguide, a first optical element, and a second optical element, in accordance with at least one embodiment described herein.

FIG. 3A is a schematic diagram of an illustrative augmented reality eyewear system 300A that includes a first lens structure 110A that includes: a first waveguide $120_1$, a second waveguide $120_2$, a first optical element 130, and a second optical element 140 and a second lens structure 110B that includes a first waveguide $120_3$, a first optical element 130, and a second optical element 140, in accordance with at least one embodiment described herein. In the first lens structure 110A, an optically transparent material 310 at least partially fills the hemispherical void space between the first optical element 130 and the second waveguide $120_2$. As depicted in FIG. 3A, the augmented reality eyewear system 300A permits the augmented reality system user 102 to use the first lens structure 110A to focus on both a first virtual object 320 that appears at the relatively close second virtual object focal plane 164 and a second virtual object 330 that appears at the relatively distant first virtual object focal plane 162. In addition, the first lens structure 110A includes the first optical element 130 and the second optical element 140 such that apparent distance to a physical object positioned in the field-of-view of the augmented reality eyewear system 200 appears at a distance that is approximately equal to the second virtual object focal plane 164.

The first waveguide $120_1$ may include a single layer waveguide or two-layer waveguide. The first waveguide $120_1$ may include a two-layer waveguide that includes one or more BG waveguides 120A and one or more RB waveguides 120B. The second waveguide $120_2$ may include a single layer waveguide or two-layer waveguide. The first waveguide $120_2$ may include a two-layer waveguide that includes one or more BG waveguides 120A and one or more RB waveguides 120B. The first lens structure 110A may have a transmittivity of: greater than about 60%; greater than about 70%; greater than about 75%; greater than about 80%; or greater than about 85%. In embodiments, the first lens system 110A may have a thickness of about: 10 millimeters (mm) or less; 9 mm or less; 8 mm or less; or 7 mm or less measured along the optical axis of the first lens structure 110A.

The third waveguide $120_3$ may include a single layer waveguide or two-layer waveguide. The third waveguide $120_3$ may include a two-layer waveguide that includes one or more BG waveguides 120A and one or more RB waveguides 120B. The second lens structure 110B includes the first optical element 130 and the second optical element 140 such that a virtual object 340 appears at the relatively close second virtual object focal plane 164 and the apparent distance to a physical object positioned in the field-of-view of the augmented reality eyewear system 300A also appears at a distance that is approximately equal to the second virtual object focal plane 164. The second lens structure 110B may have a transmittivity of: greater than about 60%; greater than about 70%; greater than about 75%; greater than about 80%; or greater than about 85%. In embodiments, the second lens system 110B may have a thickness of about: 10 millimeters (mm) or less; 9 mm or less; 8 mm or less; or 7 mm or less measured along the optical axis of the second lens structure 110B.

FIG. 3B is a schematic diagram of an illustrative augmented reality eyewear system 300B that includes a first lens structure 110A having: a first waveguide $120_1$, a second waveguide $120_2$, a first optical element 130, and a second optical element 140 and a second lens structure 110B having: a first waveguide $120_3$, a second waveguide $120_4$, a first optical element 130, and a second optical element 140, in accordance with at least one embodiment described herein. In the first lens structure 110A, an optically transparent material 310 at least partially fills the hemispherical void space between the first optical element 130 and the second waveguide $120_2$. In the second lens structure 110B, an optically transparent material 310 at least partially fills the hemispherical void space between the first optical element 130 and the second waveguide $120_4$.

As depicted in FIG. 3B, the augmented reality eyewear system 300B permits the augmented reality system user 102 to use the first lens structure 110A to focus on both a first virtual object 320 that appears at the relatively close second virtual object focal plane 164 and a second virtual object 330 that appears at the relatively distant first virtual object focal plane 162. In addition, the first lens structure 110A includes the first optical element 130 and the second optical element 140 such that apparent distance to a physical object positioned in the field-of-view of the augmented reality eyewear system 300A appears at a distance that is approximately equal to the second virtual object focal plane 164. Similarly, the second lens structure 110B permits the augmented reality system user 102 to focus on both a first virtual object 340 that appears at the relatively close second virtual object focal plane 164 and a second virtual object 350 that appears at the relatively distant first virtual object focal plane 162. In addition, the second lens structure 110B includes the first optical element 130 and the second optical element 140 such that apparent distance to a physical object positioned in the field-of-view of the augmented reality eyewear system 300B appears at a distance that is approximately equal to the second virtual object focal plane 164.

The first waveguide $120_1$ may include a single layer waveguide or two-layer waveguide. The first waveguide $120_1$ may include a two-layer waveguide that includes one or more BG waveguides 120A and one or more RB waveguides 120B. The second waveguide $120_2$ may include a single layer waveguide or two-layer waveguide. The second waveguide $120_2$ may include a two-layer waveguide that includes one or more BG waveguides 120A and one or more RB waveguides 120B. The first lens structure 110A may have a transmittivity of: greater than about 60%; greater than about 70%; greater than about 75%; greater than about 80%; or greater than about 85%. In embodiments, the first lens system 110A may have a thickness of about: 10 millimeters (mm) or less; 9 mm or less; 8 mm or less; or 7 mm or less measured along the optical axis of the first lens structure 110A.

The first waveguide $120_3$ may include a single layer waveguide or two-layer waveguide. The first waveguide $120_3$ may include a two-layer waveguide that includes one or more BG waveguides 120A and one or more RB waveguides 120B. The second waveguide $120_4$ may include a single layer waveguide or two-layer waveguide. The second waveguide $120_4$ may include a two-layer waveguide that includes one or more BG waveguides 120A and one or more RB waveguides 120B. The second lens structure 110B may have a transmittivity of: greater than about 60%; greater than about 70%; greater than about 75%; greater than about 80%; or greater than about 85%. In embodiments, the second lens system 110B may have a thickness of about: 10 millimeters (mm) or less; 9 mm or less; 8 mm or less; or 7 mm or less measured along the optical axis of the second lens structure 110B.

FIG. 4 is a schematic diagram of an illustrative triple focal plane augmented reality eyewear system 400 that includes a first lens structure 110A having: a first waveguide $120_1$, a second waveguide $120_2$, a first optical element 130, a second optical element 140, and a third optical element 410, and a second lens structure 110B having: a third waveguide $120_3$, a fourth waveguide $120_4$, a first optical element 130, and a second optical element 140, in accordance with at least one embodiment described herein. As depicted in FIG. 4, in embodiments, the third optical element 410 may be disposed transverse to the optical axis of the first lens structure 110 and positioned between the second waveguide $120_2$ and the augmented reality system user 102. In the first lens structure 110A, an optically transparent material 420 at least partially fills the hemispherical void space between the first optical element 130 and the second waveguide $120_2$. In the second lens structure 110B, an optically transparent material 420 at least partially fills the hemispherical void space between the first optical element 130 and the fourth waveguide $120_4$.

The third optical element 410 included in the first lens structure 110A may include a simple lens or a compound lens system. In embodiments, the third optical element 410 includes a plano-concave lens disposed proximate a first surface of the second waveguide $120_2$. The third optical element 410 may include one or more lenses fabricated using one or more materials such as glass, polycarbonate, plastic, high-index plastic, and similar.

As depicted in FIG. 4, the augmented reality eyewear system 400 permits the augmented reality system user 102 to use the first lens structure 110A to focus on both a first virtual object 430 that appears at the relatively close second virtual object focal plane 164 and a second virtual object 440 that appears at an intermediate virtual object focal plane 442. For example, the first lens structure 110A may cause the first virtual object 430 to appear at a first virtual object focal plane 174 of about 70 centimeters (cm) and the second virtual object 440 to appear at an intermediate virtual object focal plane 442 of about 350 cm. In addition, the first optical element 130 and the second optical element 140 included in the first lens structure 110A causes physical objects positioned in the field-of-view of the first lens structure 110A to appear to the augmented reality eyewear system user 102 at a distance that is approximately equal to the second virtual object focal plane 164 (i.e., at an apparent distance of about 70 cm).

The second lens structure 110B permits the augmented reality eyewear system user 102 to focus on both a first virtual object 450 that appears at the relatively close second virtual object focal plane 164 and a second virtual object 460 that appears at the relatively distant first virtual object focal plane 162. For example, the second lens structure 110B may cause the first virtual object 450 to appear at the first virtual object focal plane 174 of about 70 centimeters (cm) and the second virtual object 460 to appear at a relatively distant virtual object focal plane 162 of about 700 cm. In addition, the first optical element 130 and the second optical element 140 included in the second lens structure 110B causes physical objects positioned in the field-of-view of the second lens structure 110B to appear to the augmented reality eyewear system user 102 at a distance that is approximately equal to the second virtual object focal plane 164 (i.e., at an apparent distance of about 70 cm).

The first lens structure 110A may include one or more multi-layer waveguides 120. In embodiments, such as the illustrative augmented reality system 400 depicted in FIG. 4, the first lens structure 110A includes a two-layer first waveguide 120$_1$ formed by a GB waveguide layer 120A disposed proximate an RB waveguide layer 120B. The first lens structure 110A additionally includes a two-layer second waveguide 120$_2$ also formed by a GB waveguide layer 120A disposed proximate an RB waveguide layer 120B. The first lens structure 110A may have a transmittivity of: greater than about 60%; greater than about 70%; greater than about 75%; greater than about 80%; or greater than about 85%. In embodiments, the first lens structure 110A may have a thickness of about: 10 millimeters (mm) or less; 9 mm or less; 8 mm or less; or 7 mm or less measured along the optical axis of the first lens structure 110A.

The second lens structure 110B may include one or more multi-layer waveguides 120. In embodiments, such as the illustrative augmented reality system 400 depicted in FIG. 4, the second lens structure 110A includes a two-layer third waveguide 120$_3$ formed by a GB waveguide layer 120A disposed proximate an RB waveguide layer 120B. The second lens structure 110B additionally includes a two-layer fourth waveguide 120$_4$ also formed by a GB waveguide layer 120A disposed proximate an RB waveguide layer 120B. The second lens structure 110B may have a transmittivity of: greater than about 60%; greater than about 70%; greater than about 75%; greater than about 80%; or greater than about 85%. In embodiments, the second lens structure 110B may have a thickness of about: 10 millimeters (mm) or less; 9 mm or less; 8 mm or less; or 7 mm or less measured along the optical axis of the second lens structure 110B.

FIG. 5 is a schematic diagram of an illustrative triple focal plane augmented reality eyewear system 500 that includes a first lens structure 110A having: a first, single-layer, RG waveguide 120$_1$, a second, single-layer, BG waveguide 120$_2$, a first optical element 130, a second optical element 140; and, a second lens structure 110B having: a third, multi-layer, waveguide 120$_3$, a first optical element 130, and a second optical element 140, in accordance with at least one embodiment described herein. As depicted in FIG. 5, in embodiments, the first lens structure 110A may include a first optical element 130 that separates the first, single-layer, RG waveguide 120$_1$ from the second, single-layer, BG waveguide 120$_2$. An optically transparent fill material 540 having a refractive index similar to that of the material(s) used to fabricate the first optical element 130 may be disposed to at least partially fill the hemispherical void space between a plano-concave first optical element 130 and the surface of the second waveguide 120$_2$.

As depicted in FIG. 5, the augmented reality eyewear system 500 permits the augmented reality system user 102 to use the first lens structure 110A to focus on a first, red-green, virtual object 510 that appears at the relatively close second virtual object focal plane 164 and a second, blue-green, virtual object 520 that appears at relatively distant, first virtual object focal plane 162. For example, the first lens structure 110A may cause the first, red-green, virtual object 510 to appear at a first virtual object focal plane 162 of about 70 centimeters (cm) and the second, blue-green, virtual object 520 to appear at a second virtual object focal plane 162 of about 700 cm. In addition, the first optical element 130 and the second optical element 140 included in the first lens structure 110A causes physical objects positioned in the field-of-view of the first lens structure 110A to appear to the augmented reality eyewear system user 102 at a distance that is approximately equal to the second virtual object focal plane 164 (i.e., at an apparent distance of about 70 cm). Note that the positioning of the RG waveguide 120$_1$ and the BG waveguide 120$_2$ cause a color separation of virtual objects viewed through the first lens system 110A.

The second lens structure 110B permits the augmented reality eyewear system user 102 to observe a virtual object 530 that appears at the relatively close second virtual object focal plane 164. For example, the second lens structure 110B may cause the virtual object 530 to appear at the first virtual object focal plane 162 of about 70 cm. In addition, the first optical element 130 and the second optical element 140 included in the second lens structure 110B causes physical objects positioned in the field-of-view of the second lens structure 110B to appear to the augmented reality eyewear system user 102 at a distance that is approximately equal to the second virtual object focal plane 164 (i.e., at an apparent distance of about 70 cm).

The first lens structure 110A includes the first, single-layer, RG waveguide 120$_1$ and the second, single-layer, BG waveguide 120$_2$. When combined with the second lens structure 110B, virtual objects 510 and 530 will appear in stereo in the red-green electromagnetic spectrum and virtual object 520 will appear in mono in the blue-green electromagnetic spectrum through the first lens structure 110A. The first lens structure 110A may have a transmittivity of: greater than about 60%; greater than about 70%; greater than about 75%; greater than about 80%; or greater than about 85%. In embodiments, the first lens structure 110A may have a thickness of about: 10 millimeters (mm) or less; 9 mm or less; 8 mm or less; or 7 mm or less measured along the optical axis of the first lens structure 110A.

The second lens structure 110B may include one or more multi-layer waveguides 120. In embodiments, such as the illustrative augmented reality system 500 depicted in FIG. 5, the second lens structure 110B includes a two-layer third waveguide 120$_3$ formed by a GB waveguide layer 120A disposed proximate an RB waveguide layer 120B. The second lens structure 110B may have a transmittivity of: greater than about 60%; greater than about 70%; greater than about 75%; greater than about 80%; or greater than about 85%. In embodiments, the second lens structure 110B may have a thickness of about: 10 millimeters (mm) or less; 9 mm or less; 8 mm or less; or 7 mm or less measured along the optical axis of the second lens structure 110B.

Figure 6:
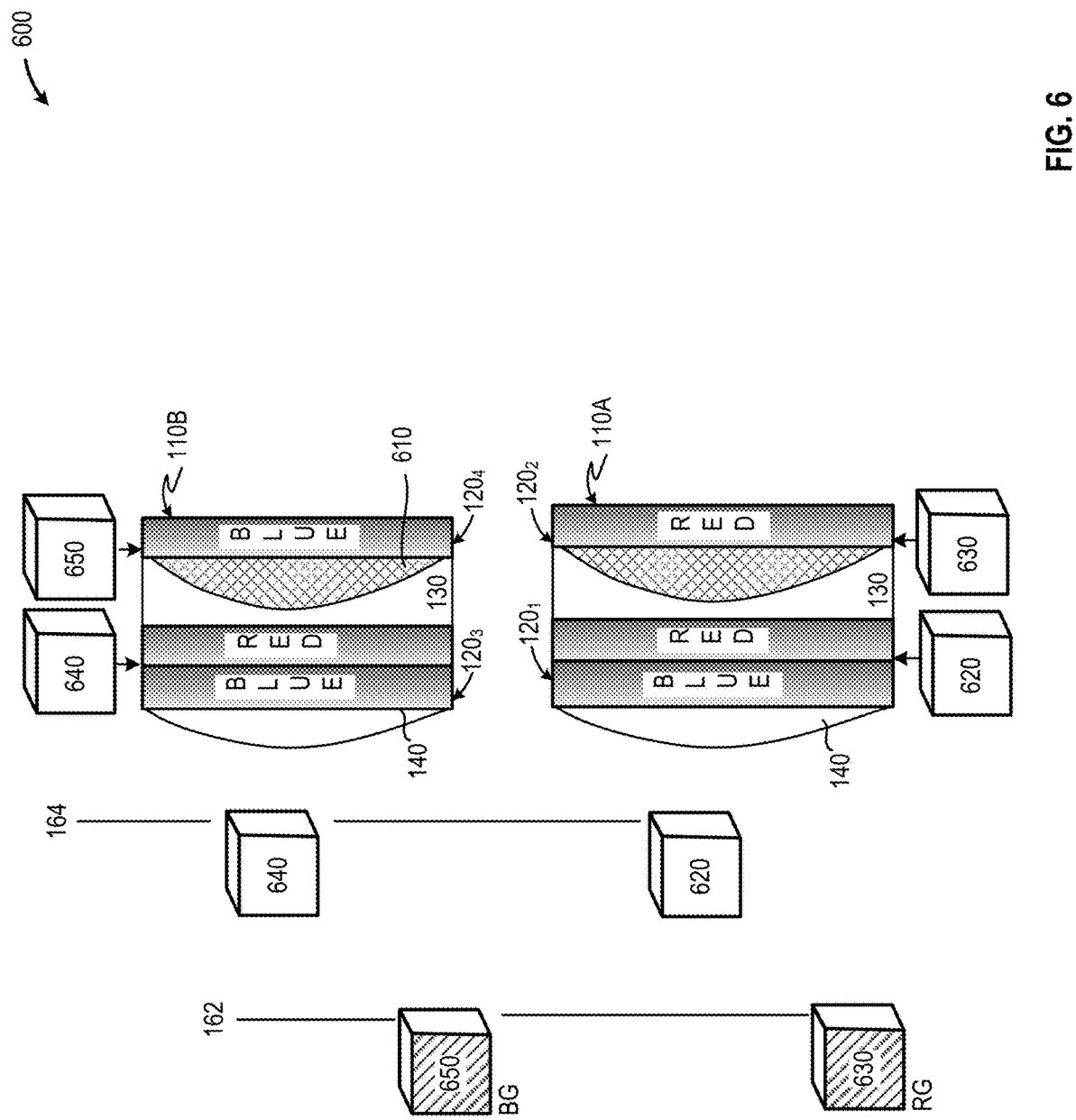
FIG. 6 is a schematic diagram of an illustrative double focal plane augmented reality eyewear system that includes a first lens structure having: a first, two-layer waveguide and a second, single-layer, RG waveguide, a first optical element, and a second optical element; and, a second lens structure having: a third, two-layer waveguide and a fourth, single-layer, BG waveguide, a first optical element, and a second optical element, in accordance with at least one embodiment described herein.

FIG. 6 is a schematic diagram of an illustrative double focal plane augmented reality eyewear system 600 that includes a first lens structure 110A having: a first, two-layer waveguide 120$_1$ and a second, single-layer, RG waveguide 120$_2$, a first optical element 130, and a second optical element 140; and, a second lens structure 110B having: a third, two-layer waveguide 120$_3$ and a fourth, single-layer, BG waveguide 120$_4$, a first optical element 130, and a second optical element 140, in accordance with at least one embodiment described herein. As depicted in FIG. 6, embodiments, the first lens structure 110A includes a two-layer waveguide that includes a BG waveguide 120A disposed proximate an RB waveguide 120B. The first optical element 130 in the first lens structure 110A separates the second, single-layer, RG waveguide 120$_2$ from the first, two-layer waveguide $120_1$. An optically transparent fill material 610 having a refractive index similar to that of the material(s) used to fabricate the first optical element 130 may be disposed to at least partially fill the hemispherical void space between a plano-concave first optical element 130 and the surface of the second waveguide $120_2$. Similarly, the first optical element 130 in the second lens structure 110B separates the fourth, single-layer, BG waveguide $120_4$ from the third, two-layer waveguide $120_3$. An optically transparent fill material 610 having a refractive index similar to that of the material(s) used to fabricate the first optical element 130 may be disposed to at least partially fill the hemispherical void space between a plano-concave first optical element 130 and the surface of the fourth, BG waveguide $120_4$.

As depicted in FIG. 6, the augmented reality eyewear system 600 permits the augmented reality system user 102 to use the first lens structure 110A to observe virtual object 620 using both the blue-green and the red-green portions of the electromagnetic spectrum. Virtual object 620 appears at the relatively close second virtual object focal plane 164. For example, the first lens structure 110A may cause the virtual object 620 to appear at the second virtual object focal plane 164 of about 70 cm. The first lens structure 110A further permits the augmented reality system user 102 to observe virtual object 630 in the red-green electromagnetic spectrum at the relatively distant first virtual object focal plane 162. For example, the first lens structure 110A may cause the virtual object 630 to appear in the red-green electromagnetic spectrum at the first virtual object focal plane 162 of about 350 cm.

Further, the augmented reality eyewear system 600 permits the augmented reality system user 102 to use the second lens structure 110A to observe virtual object 640 using both the blue-green and the red-green portions of the electromagnetic spectrum. Using the second lens structure 110B, virtual object 640 appears at the relatively close second virtual object focal plane 164. For example, the second lens structure 110B may cause the virtual object 640 to appear at the second, relatively close, virtual object focal plane 164 of about 70 cm. The second lens structure 110B permits the augmented reality system user 102 to observe virtual object 630 in the red-green electromagnetic spectrum at the relatively distant first virtual object focal plane 162. For example, the second lens structure 110A may cause the virtual object 630 to appear in the red-green electromagnetic spectrum at the first virtual object focal plane 162 of about 350 cm.

As depicted in FIG. 6, the first optical element 130 and the second optical element 140 included in the first lens structure 110A causes physical objects positioned in the field-of-view of the first lens structure 110A to appear to the augmented reality eyewear system user 102 at a distance that is approximately equal to the second virtual object focal plane 164 (i.e., at an apparent distance of about 70 cm). Similarly, the first optical element 130 and the second optical element 140 included in the second lens structure 110B causes physical objects positioned in the field-of-view of the second lens structure 110B to appear to the augmented reality eyewear system user 102 at a distance that is approximately equal to the second virtual object focal plane 164 (i.e., at an apparent distance of about 70 cm).

The first lens structure 110A may include one or more multi-layer waveguides 120. In embodiments, such as the illustrative augmented reality system 600 depicted in FIG. 6, the first lens structure 110A includes a two-layer, first waveguide $120_1$ formed by a GB waveguide layer 120A disposed proximate an RB waveguide layer 120B. The first lens structure 110A further includes a single-layer, second waveguide $120_2$ formed using an RB waveguide layer. The first lens structure 110A may have a transmittivity of: greater than about 60%; greater than about 70%; greater than about 75%; greater than about 80%; or greater than about 85%. In embodiments, the first lens structure 110A may have a thickness of about: 10 millimeters (mm) or less; 9 mm or less; 8 mm or less; or 7 mm or less measured along the optical axis of the first lens structure 110A.

The second lens structure 110B may include one or more multi-layer waveguides 120. In embodiments, such as the illustrative augmented reality system 600 depicted in FIG. 6, the second lens structure 110B includes a two-layer, third waveguide $120_3$ formed by a GB waveguide layer 120A disposed proximate an RB waveguide layer 120B. The second lens structure 110B further includes a single-layer, fourth waveguide $120_4$ formed using a BG waveguide layer. The second lens structure 110B may have a transmittivity of: greater than about 60%; greater than about 70%; greater than about 75%; greater than about 80%; or greater than about 85%. In embodiments, the second lens structure 110B may have a thickness of about: 10 millimeters (mm) or less; 9 mm or less; 8 mm or less; or 7 mm or less measured along the optical axis of the second lens structure 110B.

Figure 7:
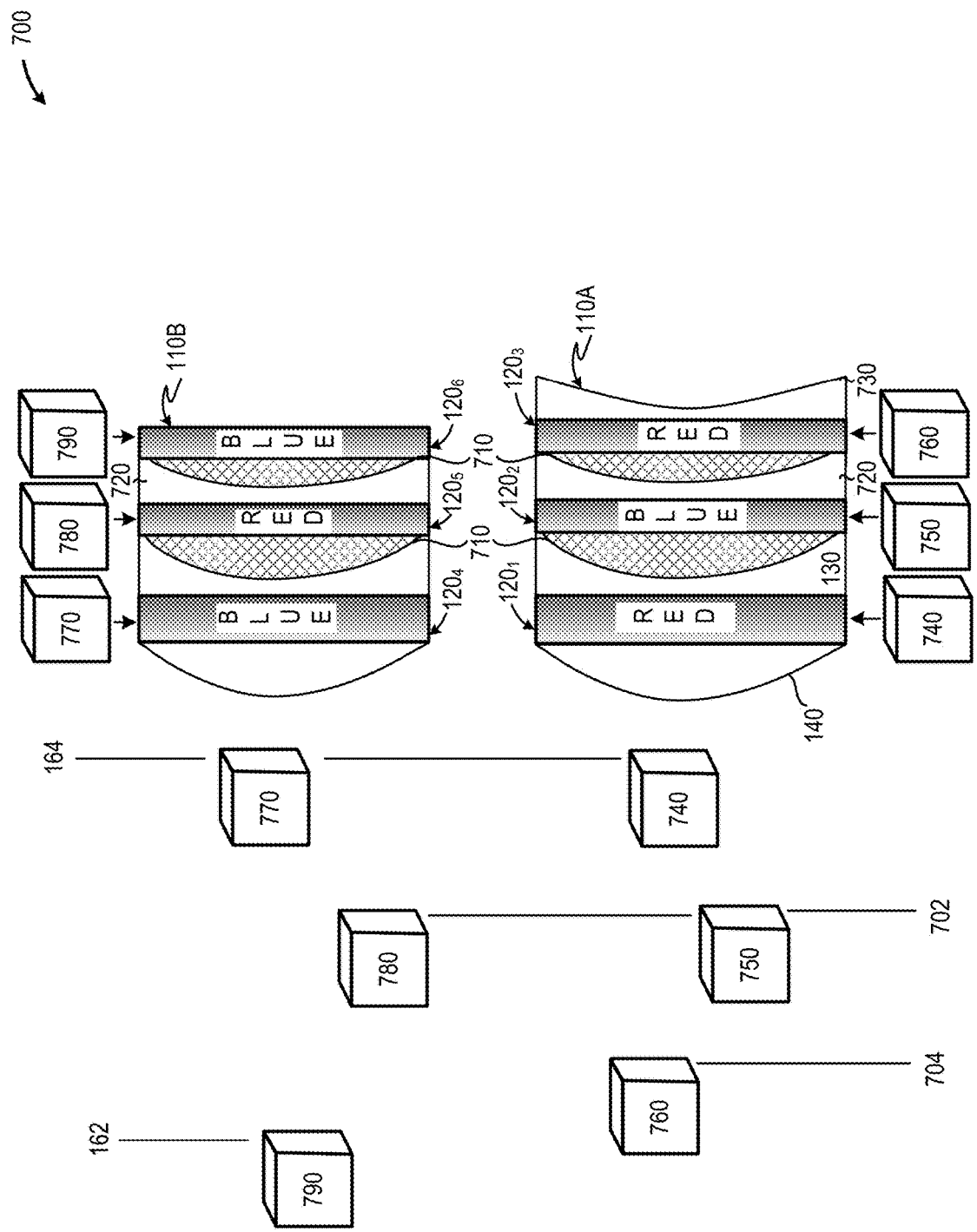
FIG. 7 is a schematic diagram of an illustrative quadruple focal plane augmented reality eyewear system that includes a first lens structure having: a first, single-layer, RG waveguide, a second, single-layer, BG waveguide, a third, single-layer, RG waveguide, a first optical element, a second optical element, a third optical element, and a fourth optical element; and, a second lens structure having: a fourth, single-layer BG waveguide, a fifth, single-layer, RB waveguide, and a sixth, single-layer, BG waveguide, a first optical element, a second optical element, and a third optical element, in accordance with at least one embodiment described herein.

FIG. 7 is a schematic diagram of an illustrative quadruple focal plane augmented reality eyewear system 700 that includes a first lens structure 110A having: a first, single-layer, RG waveguide $120_1$, a second, single-layer, BG waveguide $120_2$, a third, single-layer, RG waveguide $120_3$, a first optical element 130, a second optical element 140, a third optical element 720, and a fourth optical element 730; and, a second lens structure 110B having: a fourth, single-layer BG waveguide $120_4$, a fifth, single-layer, RB waveguide $120_5$, and a sixth, single-layer, BG waveguide $120_6$, a first optical element 130, a second optical element 140, and a third optical element 720, in accordance with at least one embodiment described herein. As depicted in FIG. 7, within the first lens structure 110A, the second, BG waveguide $120_2$ separates the first optical element 130 from the third optical element 720 and the third, RG waveguide $120_3$ separates the third optical element 720 from the fourth optical element 730. Within the second lens structure 110B, the fifth, RG waveguide $120_5$ separates the first optical element 130 from the third optical element 720 and the sixth, BG waveguide $120_6$ is disposed proximate the third optical element 730.

Within the first lens structure 110A, an optically transparent fill material 710 having a refractive index similar to that of the material(s) used to fabricate the first optical element 130 may be disposed to at least partially fill the hemispherical void spaces between the plano-concave first optical element 130 and the second BG waveguide $120_2$ and also between the second optical element 720 and the third RG waveguide $120_3$. Similarly, within the second lens structure 110B, an optically transparent fill material 710 having a refractive index similar to that of the material(s) used to fabricate the first optical element 130 may be disposed to at least partially fill the hemispherical void spaces between the plano-concave first optical element 130 and the fifth RG waveguide $120_5$ and also between the second optical element 720 and the sixth BG waveguide $120_6$.

As depicted in FIG. 7, the augmented reality eyewear system 700 permits the augmented reality system user 102 to use the first lens structure 110A to observe virtual object 740 using both the blue-green and the red-green portions of the electromagnetic spectrum. Virtual object 740 appears at the relatively close second virtual object focal plane 164. For example, the first lens structure 110A may cause the virtual object 740 to appear at the second virtual object focal plane 164 of about 70 cm. The first lens structure 110A further permits the augmented reality system user 102 to observe virtual object 750 at a first intermediate virtual object focal plane 752. For example, the first lens structure 110A may cause the virtual object 750 to appear at the first intermediate virtual object focal plane 752 of about 120 cm. The first lens structure 110A further permits the augmented reality system user 102 to observe virtual object 760 primarily in the red-green electromagnetic spectrum at a second intermediate virtual object focal plane 762. For example, the first lens structure 110A may cause the virtual object 760 to appear primarily in the red-green electromagnetic spectrum at the second intermediate virtual object focal plane 762 of about 170 cm.

Further, the augmented reality eyewear system 700 permits the augmented reality system user 102 to use the second lens structure 110A to observe virtual object 770 using both the blue-green and the red-green portions of the electromagnetic spectrum. Using the second lens structure 110B, virtual object 770 appears at the relatively close second virtual object focal plane 164. For example, the second lens structure 110B may cause the virtual object 770 to appear at the second, relatively close, virtual object focal plane 164 of about 70 cm. The second lens structure 110B permits the augmented reality system user 102 to observe virtual object 780 at the first intermediate virtual object focal plane 752. For example, the second lens structure 110B may cause the virtual object 780 to appear at the first intermediate virtual object focal plane 752 of about 120 cm. The second lens structure 110B permits the augmented reality system user 102 to observe virtual object 790 primarily in the blue-green electromagnetic spectrum at the relatively distant first virtual object focal plane 162. For example, the second lens structure 110B may cause the virtual object 790 to appear primarily in the blue-green electromagnetic spectrum at the first virtual object focal plane 162 of about 350 cm.

As depicted in FIG. 7, the first optical element 130 and the second optical element 140 included in the first lens structure 110A causes physical objects positioned in the field-of-view of the first lens structure 110A to appear to the augmented reality eyewear system user 102 at a distance that is approximately equal to the second virtual object focal plane 164 (i.e., at an apparent distance of about 70 cm). Similarly, the first optical element 130 and the second optical element 140 included in the second lens structure 110B causes physical objects positioned in the field-of-view of the second lens structure 110B to appear to the augmented reality eyewear system user 102 at a distance that is approximately equal to the second virtual object focal plane 164 (i.e., at an apparent distance of about 70 cm).

The first lens structure 110A may include one or more single- and/or multi-layer waveguides 120. In embodiments, such as the illustrative augmented reality system 700 depicted in FIG. 7, the first lens structure 110A includes a first waveguide $120_1$ formed by a RB waveguide, a second waveguide $120_2$ formed by a single-layer, BG waveguide, and a third waveguide $120_3$ formed by a single-layer, RG waveguide. The first lens structure 110A may have a transmittivity of: greater than about 60%; greater than about 70%; greater than about 75%; greater than about 80%; or greater than about 85%. In embodiments, the first lens structure 110A may have a thickness of about: 10 millimeters (mm) or less; 9 mm or less; 8 mm or less; or 7 mm or less measured along the optical axis of the first lens structure 110A.

The second lens structure 110B may include one or more single- and/or multi-layer waveguides 120. In embodiments, such as the illustrative augmented reality system 700 depicted in FIG. 7, the second lens structure 110B includes a fourth waveguide $120_4$ formed by a BG waveguide, a fifth waveguide $120_5$ formed by a single-layer, RG waveguide, and a sixth waveguide $120_6$ formed by a single-layer, BG waveguide. The second lens structure 110B may have a transmittivity of: greater than about 60%; greater than about 70%; greater than about 75%; greater than about 80%; or greater than about 85%. In embodiments, the second lens structure 110B may have a thickness of about: 10 millimeters (mm) or less; 9 mm or less; 8 mm or less; or 7 mm or less measured along the optical axis of the second lens structure 110B.

Figure 8B:
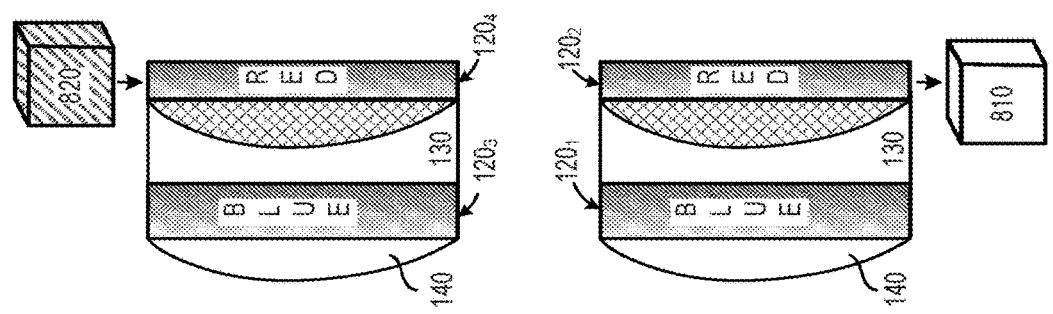
FIG. 8B is a schematic diagram of an illustrative dual focal plane, stereoscopic, augmented reality eyewear system that includes a first lens structure having: a first, single-layer, BG waveguide, a second, single-layer, RG waveguide, a first optical element, and a second optical element; and, a second lens structure having: a third, single-layer RG waveguide, a fourth, single-layer, BG waveguide, a first optical element, and a second optical element, in accordance with at least one embodiment described herein.
Figure 8A:
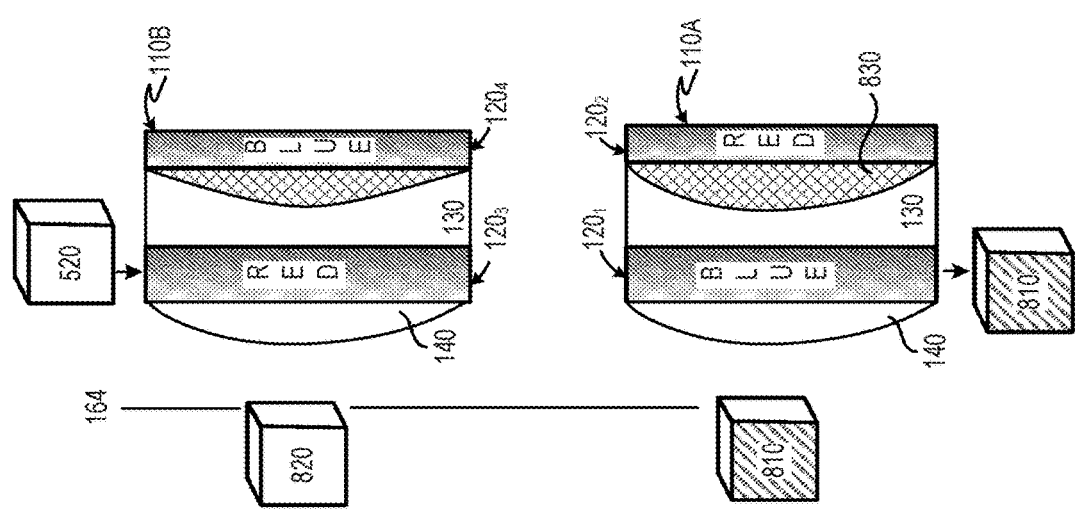
FIG. 8A is a schematic diagram of an illustrative dual focal plane, stereoscopic, augmented reality eyewear system that includes a first lens structure having: a first, single-layer, BG waveguide, a second, single-layer, RG waveguide, a first optical element, and a second optical element; and, a second lens structure having: a third, single-layer RG waveguide, a fourth, single-layer, BG waveguide, a first optical element, and a second optical element, in accordance with at least one embodiment described herein.

FIG. 8A is a schematic diagram of an illustrative dual focal plane, stereoscopic, augmented reality eyewear system 800A that includes a first lens structure 110A having: a first, single-layer, BG waveguide $120_1$, a second, single-layer, RG waveguide $120_2$, a first optical element 130, and a second optical element 140; and, a second lens structure 110B having: a third, single-layer RG waveguide $120_3$, a fourth, single-layer, BG waveguide $120_4$, a first optical element 130, and a second optical element 140, in accordance with at least one embodiment described herein. The augmented reality eyewear system 800 generates a stereo approximation of a virtual object appearing at the relatively close, second virtual object focal plane 164 by providing as much object content as possible in different portions of the electromagnetic spectrum to both eyes.

For example, as depicted in FIG. 8A, the red dominant points on virtual object 820 appear to the augmented reality eyewear system user 102 on the second, relatively close, virtual object focal plane 164 of the second lens structure 110B and on the third, single-layer, RG waveguide $120_3$. Using one or more configurable metrics, a "stereo counterpart" of the red-dominant object point is generated for the overlapping spectrum and rendered to the relatively close, virtual object focal plane 164 of the first lens structure 110A and on the first, single-layer BG waveguide $120_1$. Blue-dominant points on virtual object 810 may be analogously handled by alternating the virtual object input between the first lens structure 110A and the second lens structure 110B. Green-dominant points on the virtual object 820 may be directly rendered by both the first lens structure 110A and/or the second lens structure 110B.

FIG. 8B is a schematic diagram of an illustrative dual focal plane, stereoscopic, augmented reality eyewear system 800B that includes a first lens structure 110A having: a first, single-layer, BG waveguide $120_1$, a second, single-layer, RG waveguide $120_2$, a first optical element 130, and a second optical element 140; and, a second lens structure 110B having: a third, single-layer RG waveguide $120_3$, a fourth, single-layer, BG waveguide $120_4$, a first optical element 130, and a second optical element 140, in accordance with at least one embodiment described herein. The augmented reality eyewear system 800B generates a stereo approximation of a virtual object appearing at the first, relatively distant, virtual object focal plane 162 by providing as much object content as possible in different portions of the electromagnetic spectrum via both the first lens structure 110A and the second lens structure 110B.

For example, as depicted in FIG. 8B, the augmented reality eyewear system user 102 may observe red dominant points on virtual object 810 may be displayed in both the RG electromagnetic spectrum and the BG electromagnetic spectrum via the first lens structure 110A, and via the second, single-layer, RG waveguide $120_2$. The second lens structure 110B provides the stereo counterpart to the augmented reality eyewear system user 102 and via the fourth, single-layer, BG waveguide $120_4$. Blue-dominant points on virtual object 820 may be analogously handled by alternating the virtual object input between the first lens structure 110A and the second lens structure 110B. Green-dominant points on the virtual object 820 may be directly rendered by both the first lens structure 110A and/or the second lens structure 110B.

FIG. 9A is an elevation of an illustrative bifocal augmented reality eyewear system 900A that includes an upper portion capable of displaying virtual objects at the first, relatively distant, virtual object focal plane 162 and a lower portion capable of displaying virtual objects at the second, relatively close, virtual object focal plane 164, in accordance with at least one embodiment described herein. FIG. 9B is a cross-sectional elevation of the bifocal lens depicted in FIG. 9A that more clearly depicts the two-layer waveguide 120 disposed between the first optical element 130 and the second optical element 140, in accordance with at least one embodiment described herein.

As depicted in FIGS. 9A and 9B, the augmented reality eyewear system 900A may include a waveguide 120 that covers at least a portion of an upper portion 910B of the lens. The portion of the waveguide 120 disposed proximate the upper portion 910B allows the augmented reality eyewear system user 102 to observe virtual objects that appear at the first, relatively distant, virtual object focal plane 162. The portion of the waveguide 120 disposed proximate the lower portion 910A allows the augmented reality eyewear system user 102 to observe virtual objects that appear at the second, relatively close, virtual object focal plane 164.

As depicted in FIGS. 9A and 9B, the two-layer waveguide 120 may include a BG waveguide 120A disposed proximate a RG waveguide 120B. The waveguide 120 may be disposed between the first optical element 130 and the second optical element 140. The two-layer waveguide 120 may be embedded into the lens stack to support a display of one or more virtual objects at both the relatively distant, first virtual object focal plane 162 and the relatively close, second virtual object focal plane 164. In the embodiments, the first optical element 130 may include a plano-convex lens 130 disposed proximate a first surface of the waveguide 120 and the second optical element 140 may include a plano-concave lens 140 disposed proximate a second surface of the waveguide 120.

Although FIGS. 2 through 9 depict illustrative lens structure arrangements, those of ordinary skill in the relevant arts will readily appreciate that the optical elements and waveguide layers described herein may be reconfigured in a large number of alternate arrangements using single-layer waveguides, multi-layer waveguides, simple lenses, compound lenses, and combinations thereof. Such alternative arrangements should be considered as included within the scope of this disclosure.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

As used in any embodiment herein, the terms "system" or "module" may refer to, for example, software, firmware and/or circuitry configured to perform any of the aforementioned operations. Software may be embodied as a software package, code, instructions, instruction sets and/or data recorded on non-transitory computer readable storage mediums and/or devices. Firmware may be embodied as code, instructions or instruction sets and/or data that are hard-coded (e.g., nonvolatile) in memory devices.

As used in any embodiment herein, the term "circuitry" may comprise, for example, singly or in any combination, hardwired circuitry, programmable circuitry such as computer processors comprising one or more individual instruction processing cores, state machine circuitry, and/or firmware that stores instructions executed by programmable circuitry or future computing paradigms including, for example, massive parallelism, analog or quantum computing, hardware embodiments of accelerators such as neural net processors and non-silicon implementations of the above. The circuitry may, collectively or individually, be embodied as circuitry that forms part of a larger system, for example, an integrated circuit (IC), system on-chip (SoC), desktop computers, laptop computers, tablet computers, servers, smartphones, etc.

Any of the operations described herein may be implemented in a system that includes one or more mediums (e.g., non-transitory storage mediums) having stored therein, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eMMCs), secure digital input/output (SDIO) cards, magnetic or optical cards, or any type of media suitable for storing electronic instructions. Other embodiments may be implemented as software executed by a programmable control device.

Thus, the present disclosure is directed to systems and methods for providing an augmented reality system having one or more optical structures capable of resolving virtual objects on one or more virtual object focal planes while providing a sufficient level of transmittivity and optical correction to simultaneously resolve real-world, physical, objects. The lens structures include a plurality of waveguide layers including waveguide layers demonstrating red-green sensitivity and waveguide layers demonstrating blue-green sensitivity. One or more plano-concave lenses may be used to draw virtual objects from a relatively distant first virtual object focal plane to a relatively closer second virtual object focal plane. One or more plano-convex lenses may be used to cause physical objects to appear at a distance from the augmented reality eyewear system approximately equal to the second virtual object focal plane.

The following examples pertain to further embodiments. The following examples of the present disclosure may comprise subject material such as at least one device, a method, at least one machine-readable medium for storing instructions that when executed cause a machine to perform acts based on the method, means for providing an augmented reality system having one or more optical structures capable of resolving virtual objects on one or more virtual object focal planes while providing a sufficient level of transmittivity and optical correction to simultaneously resolve real-world, physical, objects.

According to example 1, there is provided an augmented reality vision system. The system may include: a lens structure including: a waveguide emissive of at least a portion of the visible electromagnetic spectrum, the waveguide having a first surface and a transversely opposed second surface, the waveguide to: receive one or more signals including data associated with a virtual object and to emit the electromagnetic energy associated with the virtual object; and pass at least a portion of electromagnetic energy reflected by a physical object appearing within a field-of-view of the lens structure; a first optical element disposed proximate the second surface of the waveguide, the first optical element positioned between the waveguide and a user's eye; the first optical element to: pass at least a portion of the electromagnetic energy associated with the virtual object emitted by the waveguide and at least a portion of the electromagnetic energy reflected by the physical object appearing within the field-of-view of the lens structure; and cause the augmented reality object to focus at a second focal plane; a second optical element disposed proximate the first surface of the waveguide, the first convex optical element to: pass only the electromagnetic energy reflected by the physical object appearing within the field-of-view of the lens structure; and cause the physical object to appear at the second focal plane.

Example 2 may include elements of example 1 where the waveguide may additionally include: a first waveguide emissive of a first portion of the visible electromagnetic spectrum; and a second waveguide emissive of a second portion of the visible electromagnetic spectrum, the second waveguide disposed proximate the first waveguide such that the first waveguide provides at least a portion of the first surface of the waveguide and the second waveguide provides at least a portion of the second surface of the waveguide.

Example 3 may include elements of any of examples 1 or 2 where the first optical element comprises a plano-concave optical element; and where the second optical element comprises a plano-convex optical element.

Example 4 may include elements of any of examples 1 through 3 where the first portion of the visible electromagnetic spectrum includes at least visible wavelengths from about 390 nanometers to about 600 nm; and where the second portion of the visible electromagnetic spectrum includes at least visible wavelengths from about 500 nm to about 760 nm.

Example 5 may include elements of any of examples 1 through 4 where the waveguide comprises a waveguide having a thickness measured along an optical axis of the lens structure of about 3.5 millimeters or less.

Example 6 may include elements of any of examples 1 through 5 where the lens structure comprises a lens having a thickness measured along the optical axis of the lens structure of about 8 millimeters or less.

Example 7 may include elements of any of examples 1 through 6 where the lens structure comprises a lens structure having a transmittivity of at least 70%.

According to example 8, there is provided an augmented reality eyewear apparatus. The apparatus may include: a first lens structure having a first optical axis and a minimum transmittivity of at least 70%, the first lens structure including: a first waveguide disposed transverse to the first optical axis and positioned at least partially between a plano-concave optical element positioned between the first waveguide and a user's eye and a plano-convex optical element positioned on a side of the first waveguide opposite the first optical element, the first waveguide to emit an image of a virtual object using at least a portion of the visible electromagnetic spectrum; the plano-concave optical element to pass at least a portion of the emitted electromagnetic energy associated with the virtual object and at least a portion of the electromagnetic energy reflected by a physical object appearing within a field-of-view of the first lens structure; and the plano-convex optical element to pass only the electromagnetic energy reflected by the physical object appearing within the field-of-view of the lens structure; a second lens structure having a second optical axis and a minimum transmittivity of at least 70%, the second lens structure including: a second waveguide disposed transverse to the second optical axis and positioned at least partially between a plano-concave optical element positioned between the second waveguide and the user's eye and a plano-convex optical element positioned on a side of the second waveguide opposite the first optical element, the second waveguide to emit an image of a virtual object using at least a portion of the visible electromagnetic spectrum; the plano-concave optical element to pass at least a portion of the emitted electromagnetic energy associated with the virtual object and at least a portion of the electromagnetic energy reflected by the physical object appearing within the field-of-view of the second lens structure; and the plano-convex optical element to pass only the electromagnetic energy reflected by the physical object appearing within the field-of-view of the second lens structure; and a frame physically coupling the first lens structure to the second lens structure.

Example 9 may include elements of example 8 where, in the first lens structure: the first waveguide comprises a first waveguide portion disposed between the plan-concave optical element and the plano-convex optical element and a second waveguide portion disposed between the plano-concave optical element and the user's eye to provide a dual focal plane first lens structure.

Example 10 may include elements of any of examples 8 or 9 where, in the second lens structure, the second waveguide comprises a first waveguide portion disposed between the plano-concave optical element and the plano-convex optical element and a second waveguide portion disposed between the plano-concave optical element and the user's eye to provide a dual focal plane first lens structure.

Example 11 may include elements of any of examples 8 through 10 where the first lens structure further includes a second plano-concave optical element; where the first waveguide comprises a first waveguide portion disposed between the plano-concave optical element and the plano-convex optical element and a second waveguide portion disposed between the plano-concave optical element and the second plano-concave optical element; user's eye to provide a dual focal plane first lens structure; and where the second waveguide comprises a first waveguide portion disposed between the plano-concave optical element and the plano-convex optical element and a second waveguide portion disposed between the plano-concave optical element and the user's eye to provide a dual focal plane second lens structure.

Example 12 may include elements 8 through 11 where the first waveguide portion of the first waveguide comprises a waveguide to emit a first portion of the visible electromagnetic spectrum; and where the second waveguide portion of the first waveguide comprises a waveguide to emit a second portion of the visible electromagnetic spectrum, the second portion of the electromagnetic spectrum including primarily wavelengths in the blue to green portion of the visible electromagnetic spectrum.

Example 13 may include elements of any of examples 8 through 12 where, in the second lens structure, the second waveguide comprises a first waveguide portion disposed between the first optical element and the second optical element and a second waveguide portion disposed between the second optical element and the user's eye to provide a dual focal plane first lens structure; where the first waveguide portion of the second waveguide comprises a waveguide to emit a first portion of the visible electromagnetic spectrum; and where the second waveguide portion of the second waveguide comprises a waveguide to emit a second portion of the visible electromagnetic spectrum, the second portion of the electromagnetic spectrum including wavelengths in the blue to green portion of the visible electromagnetic spectrum.

Example 14 may include elements of any of examples 8 through 13 where the first waveguide portion of the first waveguide comprises a waveguide to emit a first portion of the visible electromagnetic spectrum, the first portion of the electromagnetic spectrum including wavelengths in the red to green portion of the visible electromagnetic spectrum; and where the second waveguide portion of the first waveguide comprises a waveguide to emit a second portion of the visible electromagnetic spectrum, the second portion of the electromagnetic spectrum including wavelengths in the blue to green portion of the visible electromagnetic spectrum.

Example 15 may include elements of any of examples 8 through 14 where the second waveguide comprises a first waveguide portion disposed proximate a second waveguide portion; where the first portion of the second waveguide comprises a waveguide to emit a first portion of the visible electromagnetic spectrum, the first portion of the electromagnetic spectrum including wavelengths in the blue to green portion of the visible electromagnetic spectrum; and where the second waveguide portion of the second waveguide comprises a waveguide to emit a second portion of the visible electromagnetic spectrum, the second portion of the electromagnetic spectrum including wavelengths in the red to green portion of the visible electromagnetic spectrum.

Example 16 may include elements of any of examples 8 through 15 where the first lens structure includes a second waveguide to emit a second portion of the visible electromagnetic spectrum, the second waveguide disposed between the plano-concave optical element and the user's eye, the second portion of the electromagnetic spectrum including wavelengths in the red to green portion of the visible electromagnetic spectrum; and where, in the first lens structure, where the first waveguide comprises a first waveguide portion disposed proximate a second waveguide portion; where the first portion of the first waveguide comprises a waveguide to emit a first portion of the visible electromagnetic spectrum, the first portion of the electromagnetic spectrum including wavelengths in the blue to green portion of the visible electromagnetic spectrum; and where the second portion of the first waveguide comprises a waveguide to emit a second portion of the visible electromagnetic spectrum, the second portion of the electromagnetic spectrum including wavelengths in the red to green portion of the visible electromagnetic spectrum; where the second lens structure includes a second waveguide to emit a second portion of the visible electromagnetic spectrum, the second waveguide disposed between the plano-concave optical element and the user's eye, the second portion of the electromagnetic spectrum including wavelengths in the blue to green portion of the visible electromagnetic spectrum; and where, in the second lens structure, where the first waveguide comprises a first waveguide portion disposed proximate a second waveguide portion; where the first portion of the first waveguide comprises a waveguide to emit a first portion of the visible electromagnetic spectrum, the first portion of the electromagnetic spectrum including wavelengths in the blue to green portion of the visible electromagnetic spectrum; and where the second portion of the first waveguide comprises a waveguide to emit a second portion of the visible electromagnetic spectrum, the second portion of the electromagnetic spectrum including wavelengths in the red to green portion of the visible electromagnetic spectrum.

Example 17 may include elements of any of examples 8 through 16 where the first waveguide included in the first lens structure includes a waveguide to emit a first portion of the visible electromagnetic spectrum that includes wavelengths in the red to green portion of the visible electromagnetic spectrum; where the first lens structure provides three focal planes and further includes: a second plano-concave lens; a third plano-concave lens; a second waveguide positioned between the plano-concave lens and the second plano-concave lens, the second waveguide to emit a second portion of the visible electromagnetic spectrum that includes wavelengths in the blue to green portion of the visible electromagnetic spectrum; and a third waveguide positioned between the second plano-concave lens and the third plano-concave lens, the third waveguide to emit the first portion of the visible electromagnetic spectrum; wherein the first waveguide included in the second lens structure includes a waveguide to emit the second portion of the visible electromagnetic spectrum; wherein the second lens structure provides three focal planes and further includes: a second plano-concave lens; a second waveguide positioned between the plano-concave lens and the second plano-concave lens, the second waveguide to emit the first portion of the visible electromagnetic spectrum; and a third waveguide positioned between the second plano-concave lens and the user's eye, the third waveguide to emit the second portion of the visible electromagnetic spectrum.

Example 18 may include elements of any of examples 8 through 17 where the first lens structure further comprises a second waveguide disposed transverse to the first optical axis and positioned between the plano-concave lens and the user's eye: the second waveguide to emit a first portion of the visible electromagnetic spectrum that includes wavelengths in the red to green portion of the visible electromagnetic spectrum; and the first waveguide to emit a second portion of the visible electromagnetic spectrum that includes wavelengths in the blue to green portion of the visible electromagnetic spectrum; and where the second lens structure further comprises a second waveguide disposed transverse to the second optical axis and positioned between the plano-concave lens and the user's eye: the second waveguide in the second lens structure to emit the second portion of the visible electromagnetic spectrum; and the first waveguide in the second lens structure to emit the first portion of the visible electromagnetic spectrum.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ARC), programmable logic devices (PLD), digital signal processors (DSP), field programmable gate array (FPGA), logic gates, registers, semiconductor device, chips, microchips, chip sets, and so forth.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

What is claimed:

1. A lens structure comprising:
    a two-layer waveguide including a first waveguide and a second waveguide, the two-layer waveguide to produce a virtual object based on light from an image source, the virtual object to be visible to a user, the two-layer waveguide to cause the virtual object to appear at a first virtual object focal plane, the first waveguide to propagate more of the light in a first wavelength range than in a second wavelength range, the second waveguide to propagate more of the light in the second wavelength range than in the first wavelength range, the first wavelength range associated with longer wavelengths than the second wavelength range; and
    an optical lens to cause the virtual object to appear at a second virtual object focal plane associated with a shorter apparent distance from the user than the first virtual object focal plane.

2. The lens structure of claim 1, wherein the light is first light, the two-layer waveguide to permit second light associated with a real-world object to pass through the two-layer waveguide.

3. The lens structure of claim 2, wherein the optical lens is a first optical lens, the lens structure further including a second optical lens, the two-layer waveguide between the first optical lens and the second optical lens, the second optical lens to reduce an apparent distance between the real-world object and the virtual object at the second virtual object focal plane.

4. The lens structure of claim 1, further including a third waveguide, the optical lens positioned between the two-layer waveguide and the third waveguide.

5. The lens structure of claim 4, wherein the optical lens is a plano-concave optical lens, the lens structure further including an optically transparent material within a space between the plano-concave optical lens and the third waveguide.

6. The lens structure of claim 4, wherein the two-layer waveguide is a first two-layer waveguide, and the third waveguide is a second two-layer waveguide.

7. The lens structure of claim 4, wherein the optical lens is a first optical lens, the lens structure further including a second optical lens, the third waveguide between the first optical lens and the second optical lens.

8. The lens structure of claim 7, further including a fourth waveguide, the second optical lens between the third waveguide and the fourth waveguide.

9. The lens structure of claim 4, wherein the third waveguide is a single-layer waveguide, the third waveguide to propagate more of the light in one of the first wavelength range or the second wavelength range than in the other one of the first wavelength range or the second wavelength range.

10. The lens structure of claim 1, wherein the optical lens is smaller than the two-layer waveguide, the optical lens to cover a first portion of a surface of the two-layer waveguide, the optical lens to be spaced apart from a second portion of the surface of the two-layer waveguide.

11. The lens structure of claim 10, further including a bifocal lens, the two-layered waveguide between the bifocal lens and the optical lens.

12. A lens structure comprising:
    means for producing a virtual object visible to a user based on light from an image source, the virtual object producing means to cause the virtual object to appear at a first virtual object focal plane, the virtual object producing means including first means for propagating the light and second means for propagating the light, the first light propagating means to propagate more of the light in a first range of wavelengths than in a second range of wavelengths, the second light propagating means to propagate more of the light in the second range of wavelengths than in the first range of wavelengths, the first range of wavelengths associated with longer wavelengths than the second range of wavelengths; and
    means for causing the virtual object to appear at a second virtual object focal plane associated with a shorter apparent distance from the user than the first virtual object focal plane.

13. The lens structure of claim 12, wherein the virtual object producing means is a first virtual object producing means, the lens structure further including a second means for producing a virtual object, the causing means positioned between the first virtual object producing means and the second virtual object producing means.

14. The lens structure of claim 13, wherein the causing means is a first causing means, the lens structure further including a second means for causing a virtual object to appear at a different focal plane, the second virtual object producing means between the first causing means and the second causing means.

15. The lens structure of claim 14, further including a third virtual object producing means, the second causing means between the second virtual object producing means and the third virtual object producing means.

16. Augmented reality eyewear comprising:
a lens structure including:
- a first waveguide to generate a virtual object visible to a user wearing the eyewear based on light from an image source, the first waveguide to cause the virtual object to appear at a first virtual object focal plane;
- a second waveguide adjacent the first waveguide, the first waveguide to propagate more electromagnetic energy associated with a first range of wavelengths than electromagnetic energy associated with a second range of wavelengths, the second waveguide to propagate more electromagnetic energy associated with the second range of wavelengths than electromagnetic energy associated with the first range of wavelengths, the first range of wavelengths corresponding to longer wavelengths than the second range of wavelengths; and
- an optical lens to cause the virtual object to appear at a second virtual object focal plane associated with a shorter apparent distance from the user than the first virtual object focal plane.

17. The augmented reality eyewear of claim 16, wherein the optical lens is between the first waveguide and the second waveguide.

18. The augmented reality eyewear of claim 16, wherein the second waveguide is between the first waveguide and the optical lens.

19. The augmented reality eyewear of claim 16, wherein the lens structure is a first lens structure for a first eye of the user, the eyewear further including a second lens structure for a second eye of the user.

20. The augmented reality eyewear of claim 19, wherein the first lens structure has a different stacking of optical lenses and waveguides than the second lens structure.

21. The augmented reality eyewear of claim 19, wherein the first lens structure has more optical lenses than the second lens structure.

22. The augmented reality eyewear of claim 19, wherein the first lens structure has more waveguides than the second lens structure.

23. The augmented reality eyewear of claim 19, wherein the second lens structure includes:
- a third waveguide; and
- a fourth waveguide adjacent the third waveguide, the third waveguide to propagate more electromagnetic energy associated with the first range of wavelengths than electromagnetic energy associated with the second range of wavelengths, the fourth waveguide to propagate more electromagnetic energy associated with the second range of wavelengths than electromagnetic energy associated with the first range of wavelengths.

24. The augmented reality eyewear of claim 23, wherein, when the eyewear is worn by the user, the first waveguide is closer to the user than the second waveguide, and the third waveguide is closer to the user than the fourth waveguide.

25. The augmented reality eyewear of claim 23, wherein, when the eyewear is worn by the user, the first waveguide is closer to the user than the second waveguide, and the fourth waveguide is closer to the user than the third waveguide.

26. The lens structure of claim 12, wherein the light is first light, the virtual object producing means being transmissive to permit second light associated with a real-world object to pass through the virtual object producing means, the virtual object producing means to be between the real-world object and the user.

27. The lens structure of claim 26, further including means for reducing an apparent distance between the real-world object and the virtual object at the second virtual object focal plane.

28. The lens structure of claim 12, wherein the causing means is smaller than the virtual object producing means, the causing means to cover a first portion of a surface of the virtual object producing means, the causing means to be spaced apart from a second portion of the surface of the virtual object producing means.

29. The lens structure of claim 28, further including a bifocal lens, the virtual object producing means between the bifocal lens and the causing means.

* * * * *